(12) United States Patent
Leon

(10) Patent No.: US 7,343,894 B2
(45) Date of Patent: Mar. 18, 2008

(54) MODULAR ROTARY ENGINE

(76) Inventor: Enrique Haluy Leon, 29 Avenida 27-79 Zona 5, Guatemala (GT) 1005

( * ) Notice: Subject to any disclaimer, the term of this patent is extended or adjusted under 35 U.S.C. 154(b) by 0 days.

(21) Appl. No.: 11/163,350

(22) Filed: Oct. 16, 2005

(65) Prior Publication Data
US 2007/0084434 A1 Apr. 19, 2007

(51) Int. Cl.
F02B 53/04 (2006.01)
F02B 57/00 (2006.01)
F01C 1/00 (2006.01)
F04C 18/00 (2006.01)
F04C 2/00 (2006.01)

(52) U.S. Cl. .................... 123/241; 123/222; 123/43 R; 418/260; 418/268

(58) Field of Classification Search ............... 123/241, 123/43 R, 222; 418/268, 260, 264, 265
See application file for complete search history.

(56) References Cited

U.S. PATENT DOCUMENTS

| | | | | |
|---|---|---|---|---|
| 243,145 A * | 6/1881 | Maddox | ............... | 418/264 |
| 863,832 A * | 8/1907 | Boland | ............... | 418/265 |
| 1,019,499 A * | 3/1912 | Levy et al. | ............... | 418/265 |
| 1,153,873 A * | 9/1915 | Shore | ............... | 418/265 |
| 1,349,353 A * | 8/1920 | Wilber, Jr. | ............... | 418/260 |
| 1,790,256 A * | 1/1931 | Wright | ............... | 123/222 |
| 1,842,829 A * | 1/1932 | Gregg | ............... | 418/265 |
| 2,263,361 A * | 11/1941 | Lawrence, Jr. | ............... | 418/260 |
| 2,938,505 A * | 5/1960 | Quartier | ............... | 123/222 |
| 4,451,215 A * | 5/1984 | Winkler et al. | ............... | 418/260 |
| 4,537,162 A * | 8/1985 | Kienle | ............... | 123/43 R |
| 5,709,188 A * | 1/1998 | Al-Qutub | ............... | 418/260 |
| 6,457,450 B1 * | 10/2002 | Luzhkov | ............... | 123/241 |
| 6,668,767 B1 * | 12/2003 | Sanchez Talero et al. | .. | 123/241 |
| 6,722,321 B2 * | 4/2004 | Kim | ............... | 123/241 |
| 6,776,135 B1 * | 8/2004 | Chen et al. | ............... | 123/241 |
| 6,796,285 B2 * | 9/2004 | Karnes | ............... | 123/241 |
| 7,055,327 B1 * | 6/2006 | Pekrul et al. | ............... | 60/651 |
| 7,143,737 B2 * | 12/2006 | Kim | ............... | 123/241 |

FOREIGN PATENT DOCUMENTS

DE 4225932 A1 * 2/1994

* cited by examiner

Primary Examiner—Thai-Ba Trieu

(57) ABSTRACT

An internal combustion device, rotor self cooled, concentric and symmetric shape, dynamically variable compression ratio; capable of developing multiple Otto cycles per rotation, using modules, each made, mainly of a solenoid gate valve and three chambers operating at the rotor periphery. High power/weight ratio, that improves substantially, by increasing quantity of working modules, and without any drive shaft lengthening. With volumetric asymmetry ratio between chambers, combustion gasses quick exhaust and fast rise of air/fuel mix pressure peak. Proper for many types of combustion and class of fuels, including hydrogen, and efficient use of compressed air as external energy supply. Excels in aircraft use.

3 Claims, 33 Drawing Sheets

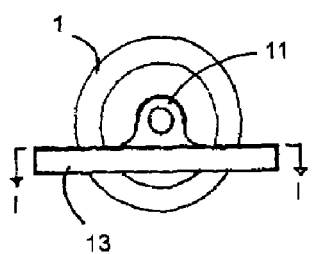
FIG 2
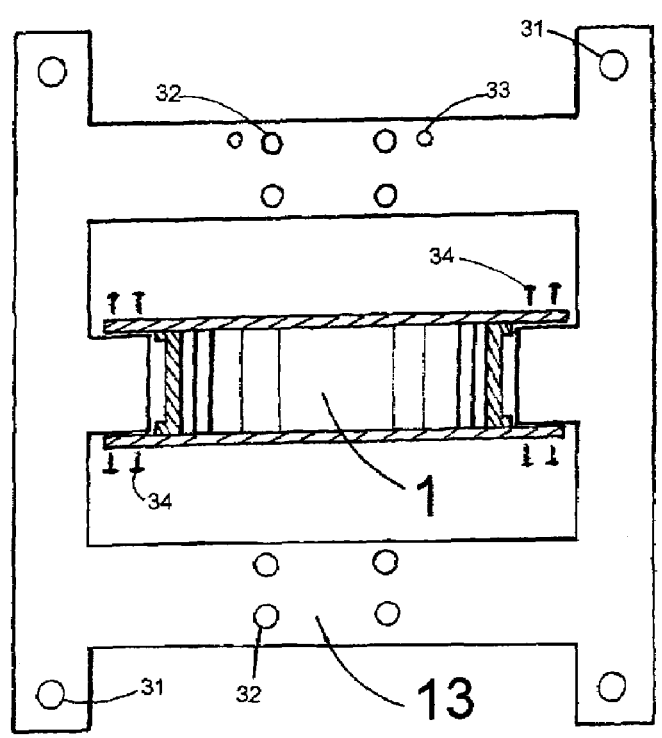
FIG. 3   I-I

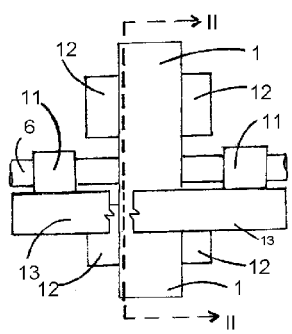
FIG. 4
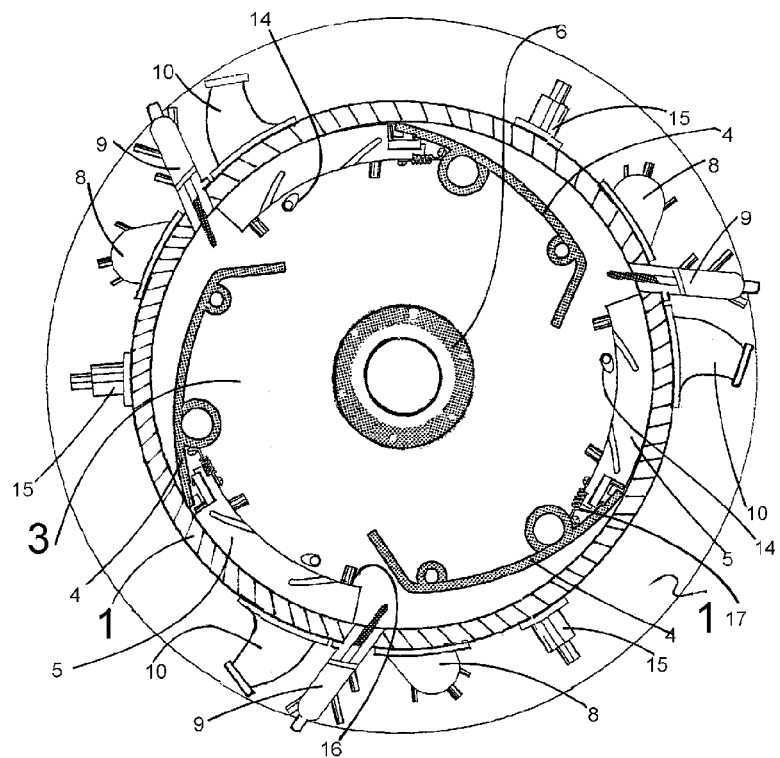
FIG. 5 II-II

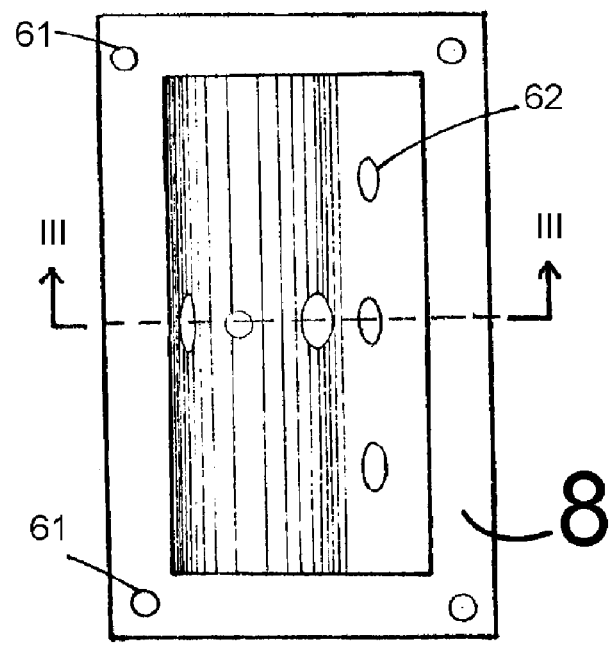
FIG. 7
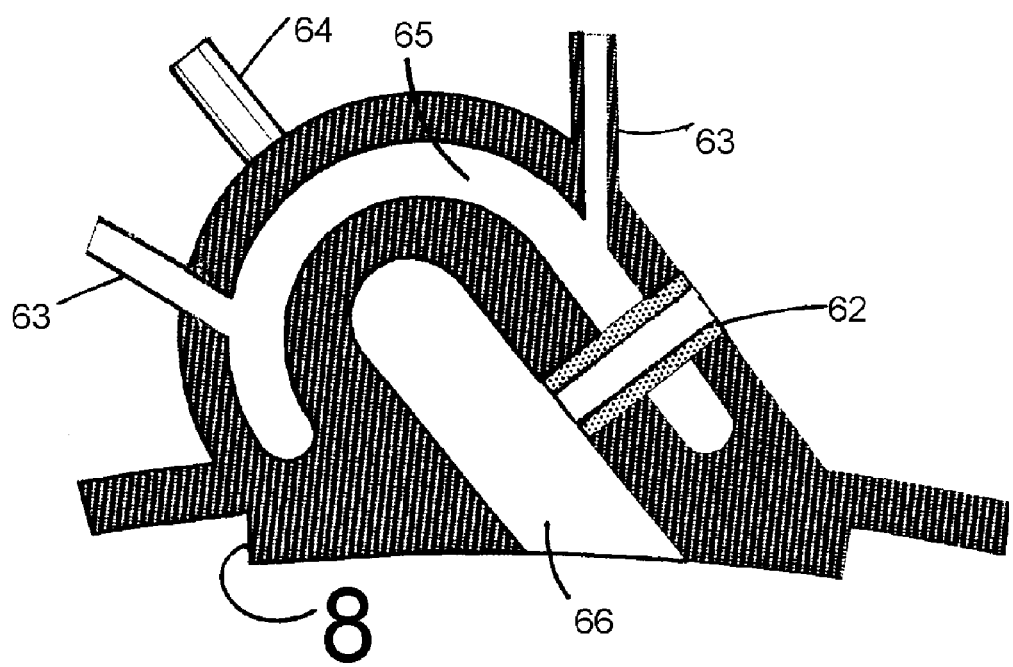
FIG. 8  III - III

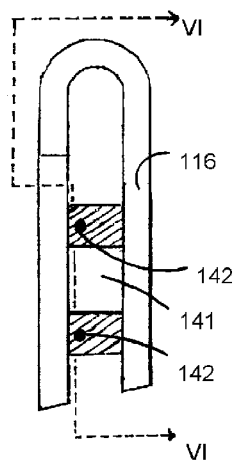
FIG. 14
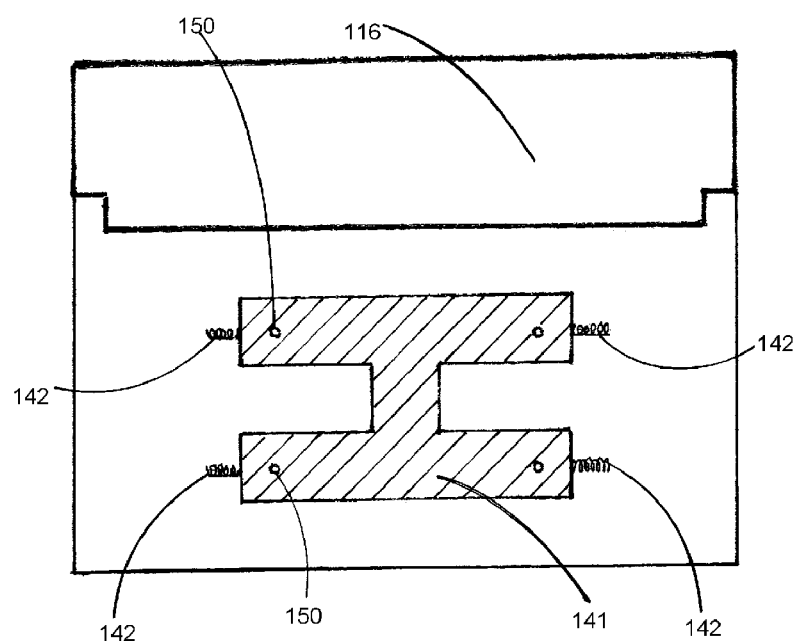
FIG. 15 VI - VI

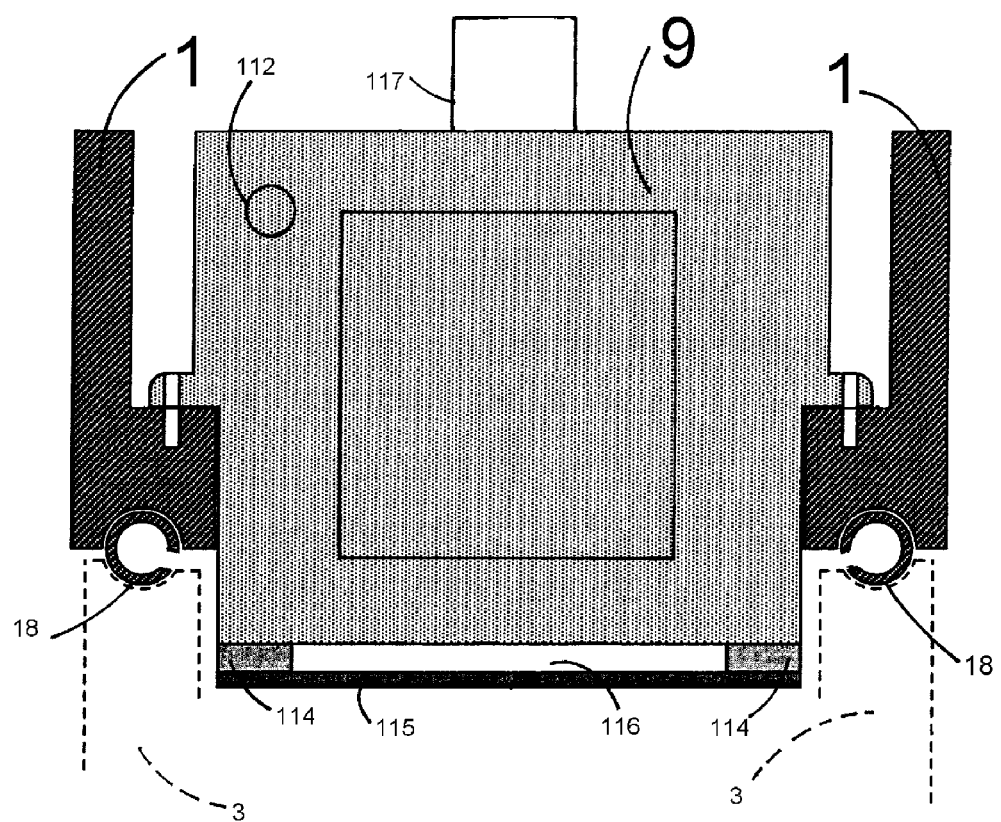
FIG. 17  VII - VII

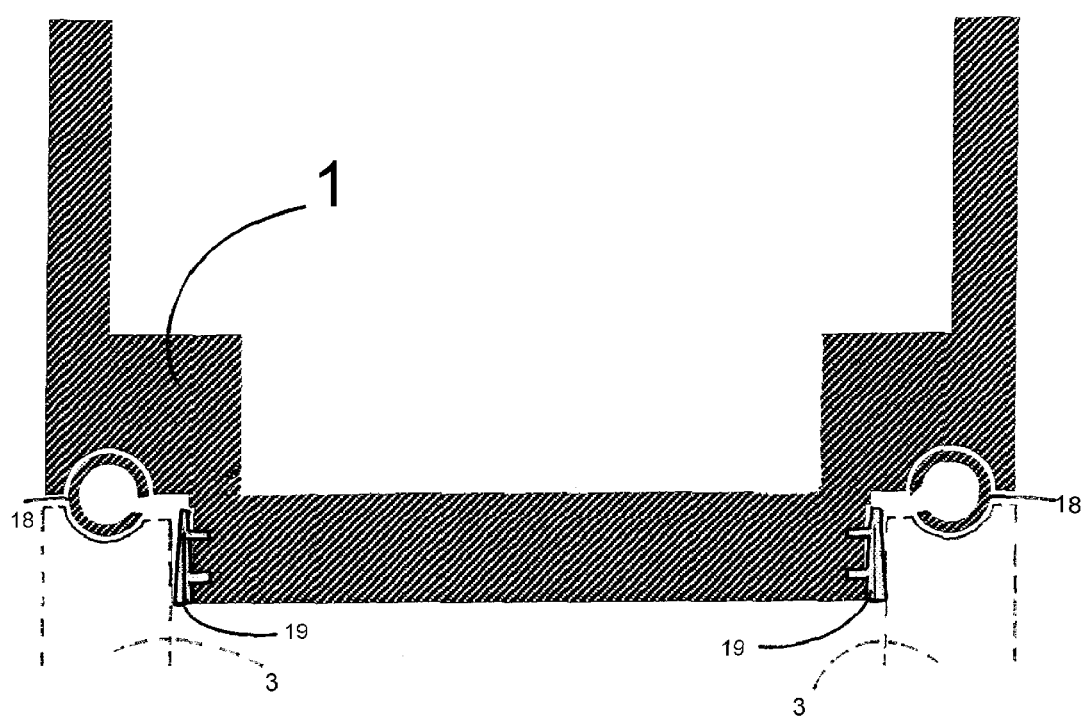
FIG. 18   VIII - VIII

IX - IX

X - X

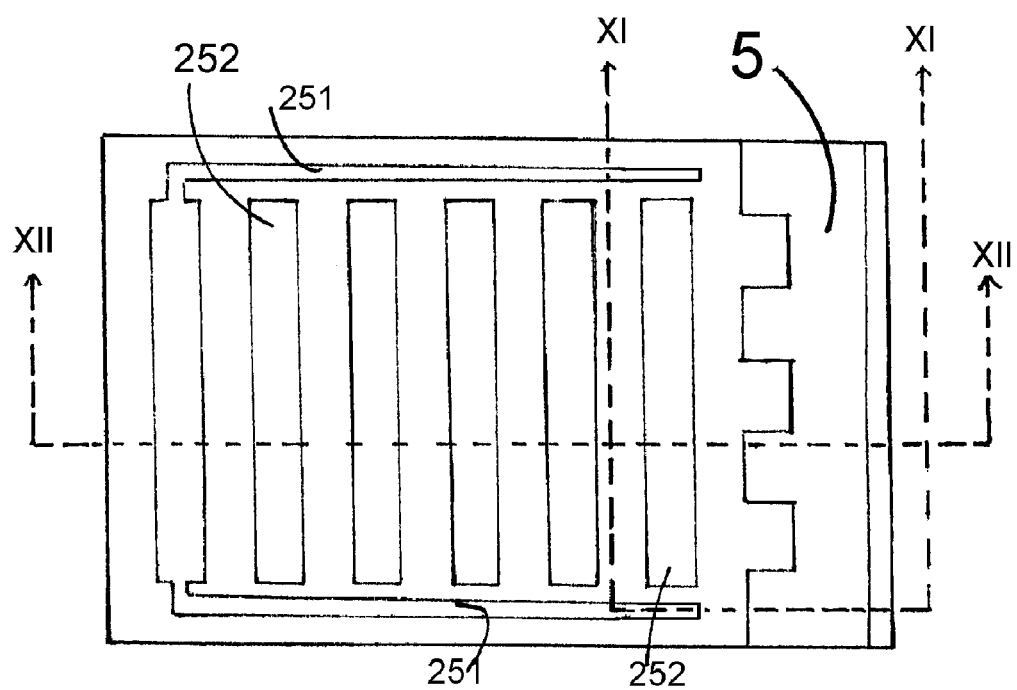
FIG. 25
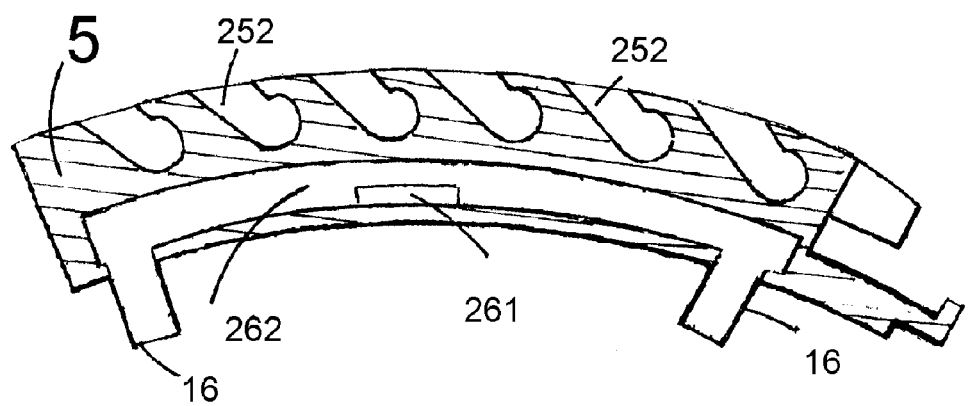
FIG. 26  XII - XII

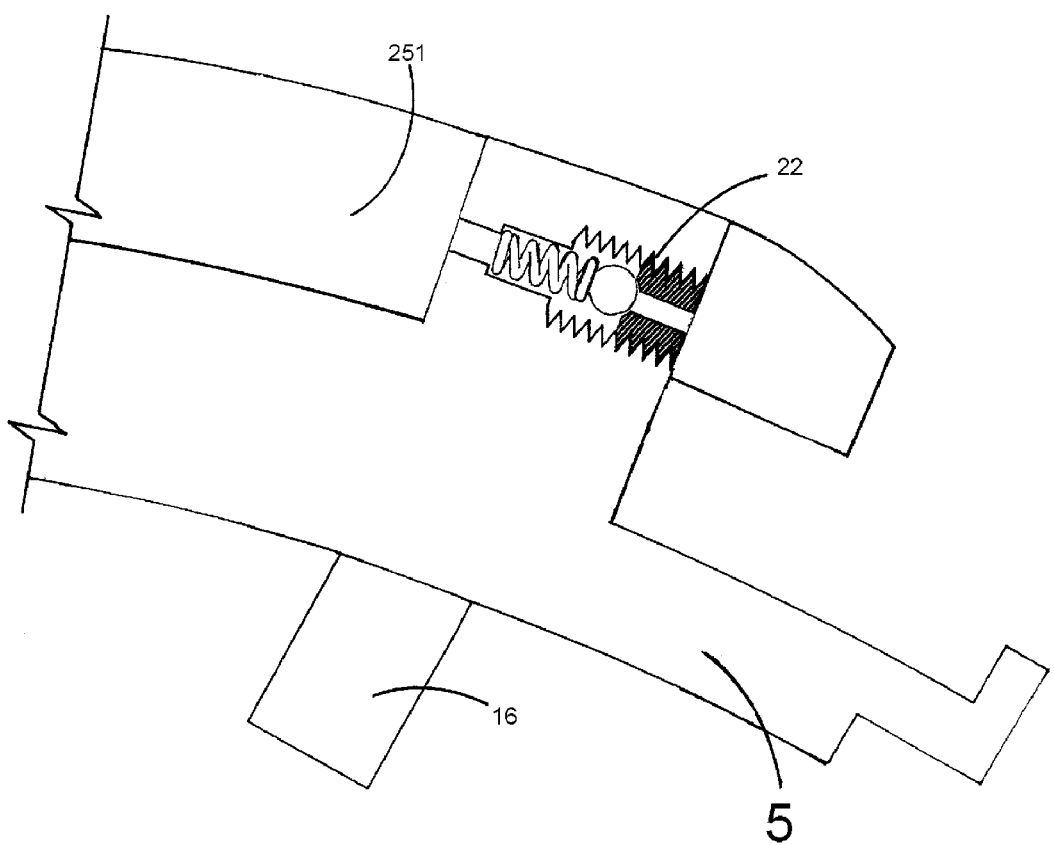
FIG. 27  XI - XI

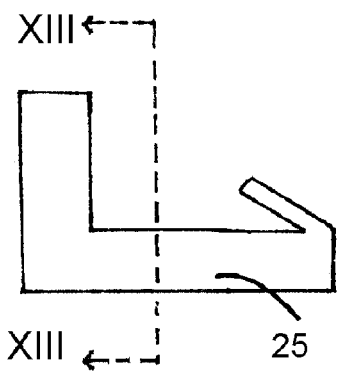
FIG. 32
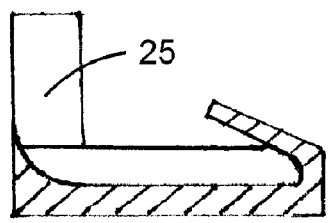
FIG. 35 XIV - XIV
FIG. 33 XIII - XIII
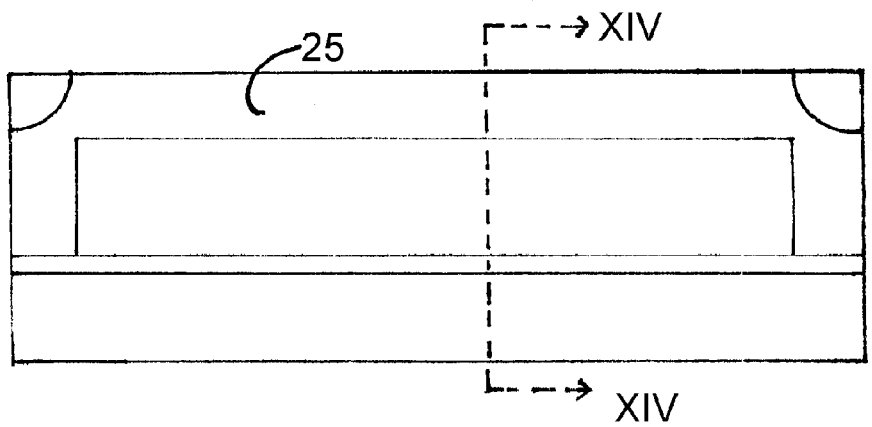
FIG. 34

FIG. 38  XV - XV

MODULAR ROTARY ENGINE

FIELD OF THE INVENTION

This invention relates at field of rotary internal combustion engines, also is related with pneumatic engines.

DESCRIPTION OF THE PRIOR ART

Nagata and Cobb, (U.S. Pat. No. 6,651,609) in recently few past years has itemized rotary engines, especially the Wankel engine, about its disadvantages, which are: vibration problems, heat problems, friction, mix wasted, difficult to build, inspect and maintain.

In general for all types of engines, is possible to add comments about another disadvantages as:

Almost of designs do not improves torsion, especially at low RPM, that implies work at high RPM regimen, with flywheels for kinetic energy storing, leading fuel waste when variation happens in acceleration.

No possibility to change compression ratio, that characteristic is wanted as altitude, load regimen, fuel class and combustion type.

Eccentricity and asymmetrical forms, typical in those engines leads to more fuel consumption, because compensatory mass is required; creating more vibrations and acceleration problems also.

Optimal function requires high RPM regime on those engines and mostly applications works satisfactory at low RPM.

Best power/weight ratio is hard to obtain, without increasing in the moving mass, heat and shaft length.

Need of gears and flywheels increase manufacturing costs, and also increase the engine overall weight.

Typically they are closed designs, purely mechanical solutions that do not allow changes. Native flexibility scarce do no let obtain other improvements, as hydrogen fuel, compressed air, and neither other types of combustion can be used. Use of modern resources as electricity, electronic, and computing have been very limited, because those developments were incorporated in adapted form, at existing designs that are from decades ago.

In transportation use, braking energy recovery is very difficult and not possible in some cases. Designers vastly majority target was getting more powerful engines, disregarding fuel efficiency and ecological considerations.

SUMMARY OF INVENTION

Accordingly, the previous disadvantages are remedied in my invention. Several objects and advantages of the invention are:

Best torsion at any load and RPM, by near tangential point of explosion force application. Dynamically variable air/fuel mix compression; at initial atmospheric pressure for adjust as requirements of combustion type, fuel class, load conditions, temperature and barometric pressure.

Engine totally concentric and symmetric form; with only one major moving part in each module, with very low reciprocating mass and short range. Plus a reduced internal friction, results in a truly fuel saver machine. This device is disposed to reduce main internal friction, manually or electrically operated; let use rotor as part of an electric motor, giving in transport, recovery energy braking capability. It can also recover energy in form of compressed air.

High power/weight ratio, capable of producing multiple Otto cycles in every rotation, increasing those cycles exponentially when numbers of modules increase. Power increase adds low weight and volume of the engine and without increasing length of drive shaft, self-cooling avoid heat problems. Low RPM engine and vibration free, brings a durable device and adequate for use of hydrogen. Separated compression and expansion chambers, makes possible to use the heat of compression to avoid freezing when use compressed air as external energy source.

Best acceleration time, without flywheel and with development of Otto cycles in two times fashion. Fast exhausted gases evacuation means a more cool and less contaminant engine. Tuned port let use exhaust backpressure, bringing fuel savings and the staged output keep noise at minimum. Volumetric asymmetric ratio between compression and expansion chambers uses better the power of explosion and let a less violent output of exhausted gases.

The device is designed for a more efficient and integrated use of computer, electronics and electricity, providing more fast time response, more versatility and more accurate control. High reliability for aircraft use because few critical parts, low fuel consumption, high power density, vibration free and smooth torsion modulation.

Compression sharp peak, because of an almost wedge form of the chamber and fast switching to the expansion chamber makes adequate for auto ignition combustion, and also the mix compression at atmospheric pressure, or higher, can enable a homogeneous charge compression ignition.

BRIEF DESCRIPTION OF DRAWINGS (A quick overview of FIGS. 1 and 5 II-II, lets a fast visual understanding of working cycle detailed in FIG. 39 and versions A, B, C and D.)

FIG. 2 shows front view of the base (13) and bearing (11) together with the stator (1). Depicts cut I-I.

Figure 1:
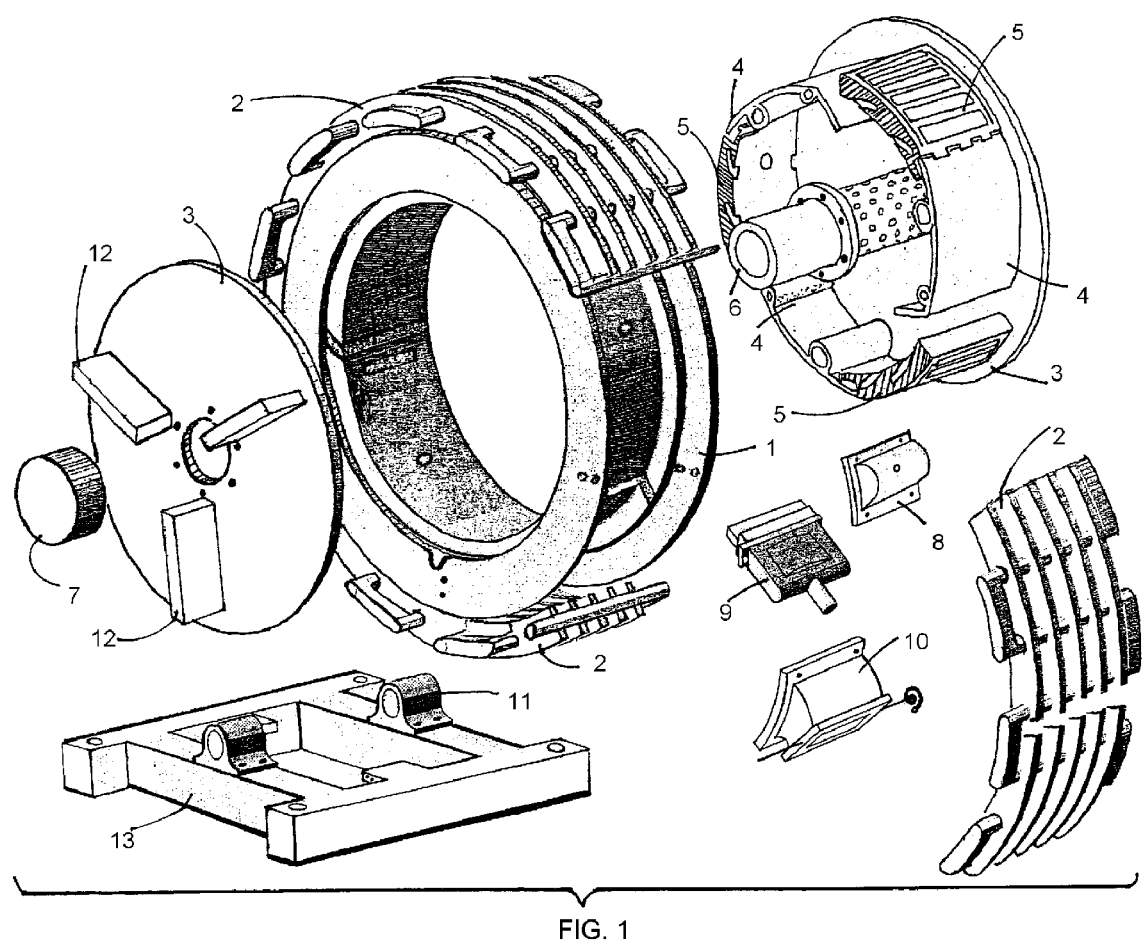
FIG. 1 (Front Page suggested) shows exploded view of main parts of a three modules engine. Remarks: top right depicts the rotor built with parts (3), (4), (5) and (6); other end (3) is far away, near the plug (7).

FIG. 3 I-I Union base (13) with stator (1) is made using screws (34).

FIG. 4 Engine lateral view sketch, showing where the cut II-II is made, let to see all three modules.

FIG. 5 II-II Cross section let see almost main inside parts. Here appears also, detach camshafts (14), fuel injectors (15), couples (16) and union springs (17). Very small parts (as packer (25), see FIG. 31) and cooling system parts not showed here. Remark: hatching area denotes stator (1) inner wall.

Figure 6:
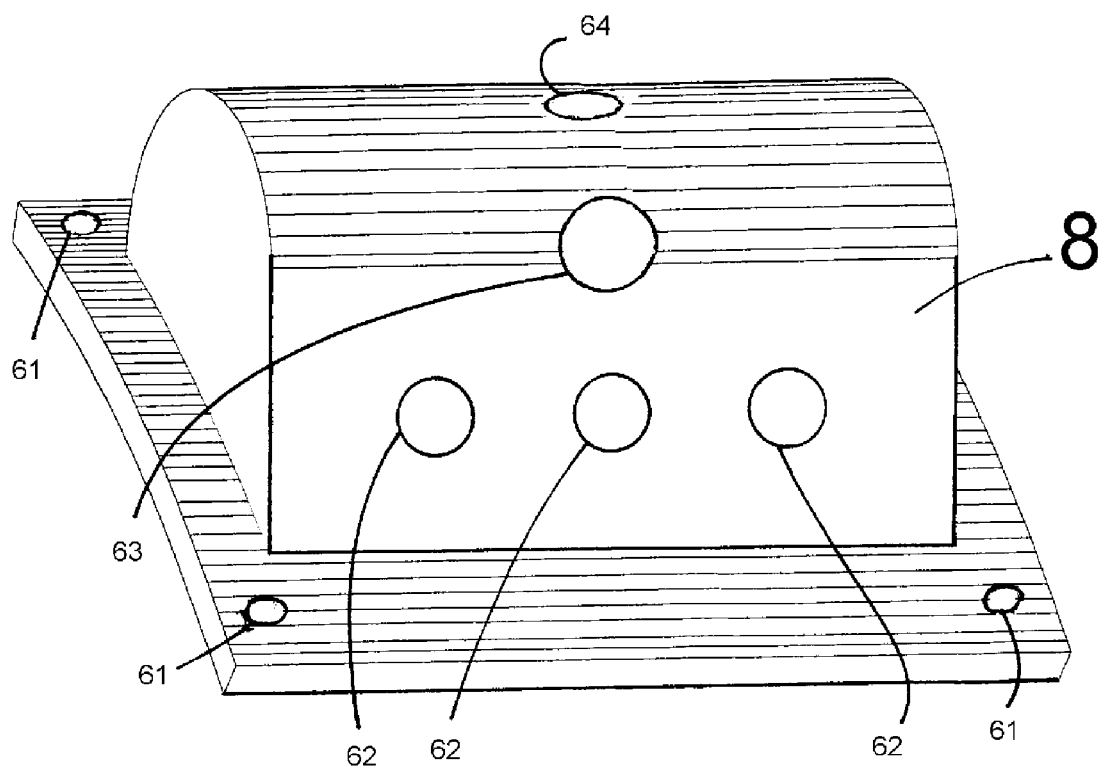

FIG. 6 Combustion chamber (8). Isometric view. Show input holes for auxiliary parts.

FIG. 7 Combustion chamber (8). Plain view. Depicts cut line III-III

FIG. 8 III-III Combustion chamber (8) lateral view in cross section. Show cooling cavity, and also the lean combustion chamber.

Figure 9:
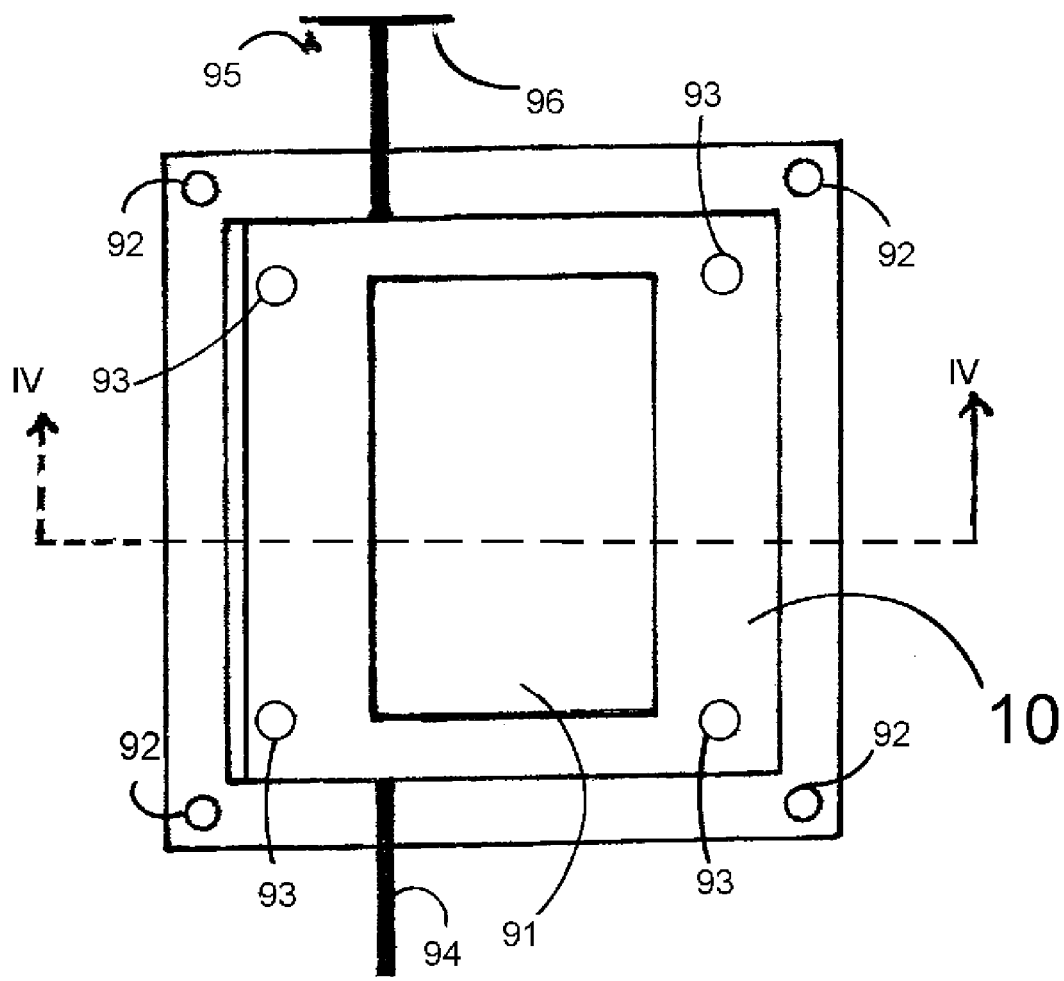

FIG. 9 Exhaust Port (10). Plain view. Shows cut line IV-IV. Remark: very small screw (95) is to attach the spiral spring (96) at the stator (1) lateral wall.

Figure 10:
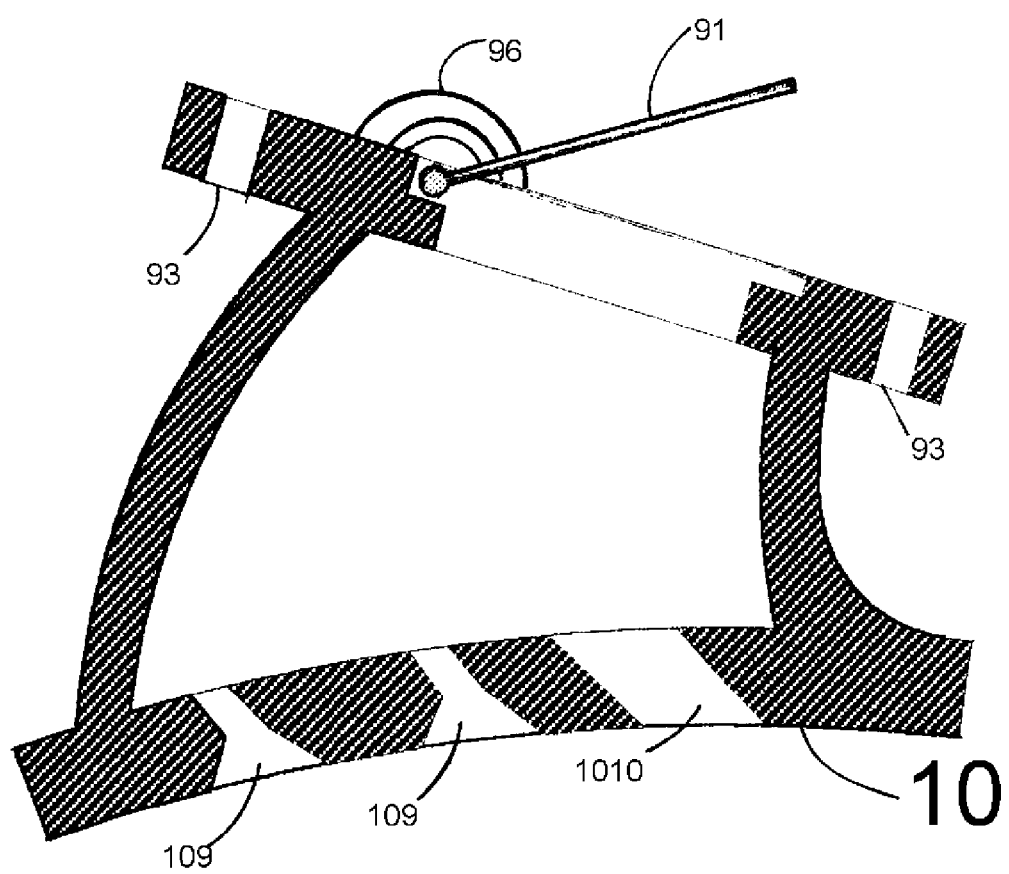

FIG. 10 IV-IV Exhaust port (10) cross-section view, remarking the tuned ports holes (109) to create backpressure.

Figure 11:
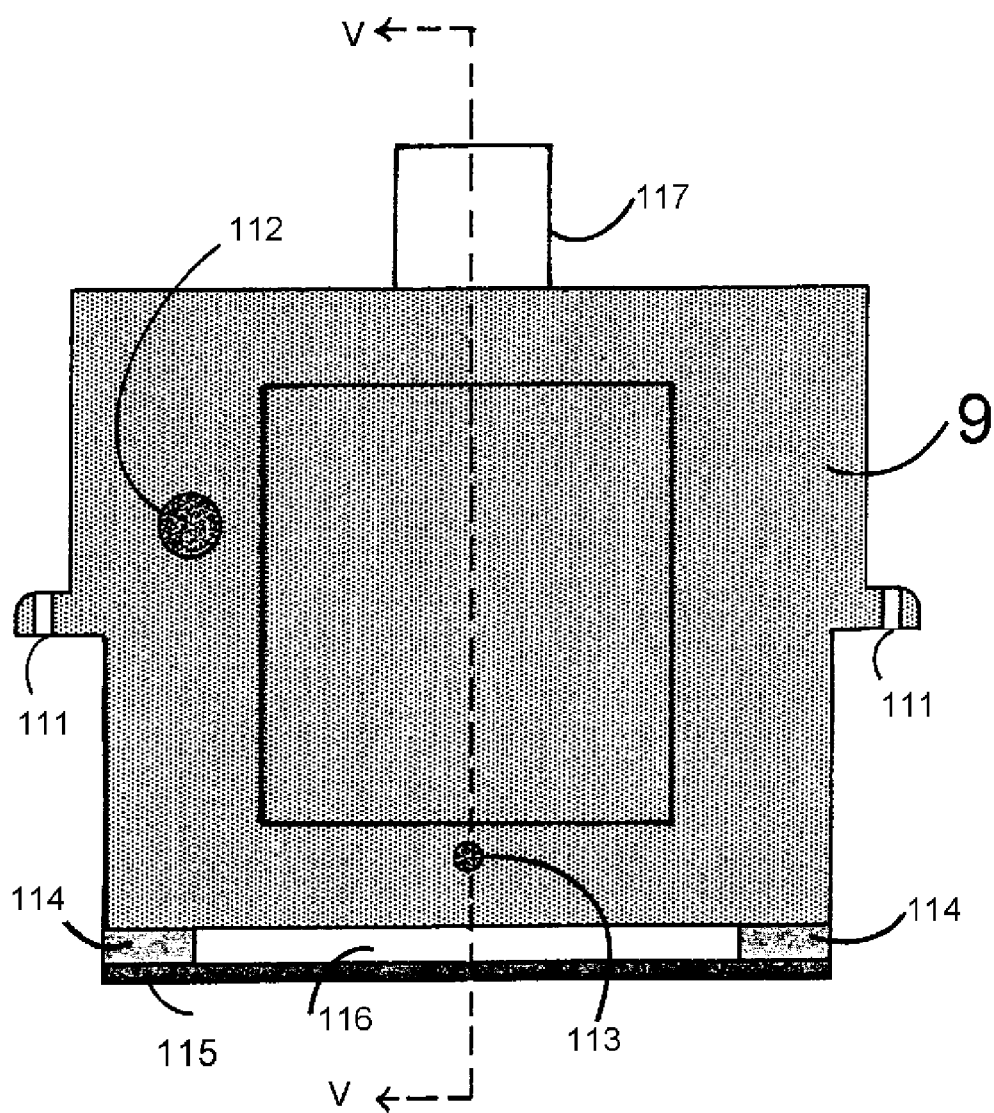

FIG. 11 Solenoid Gate (9) front view. Remarks: lateral seal (114) is showed in retracted position, the gate (116) and the other seal (115) in semi-retracted form. Cut line V-V also is showed.

Figure 12:
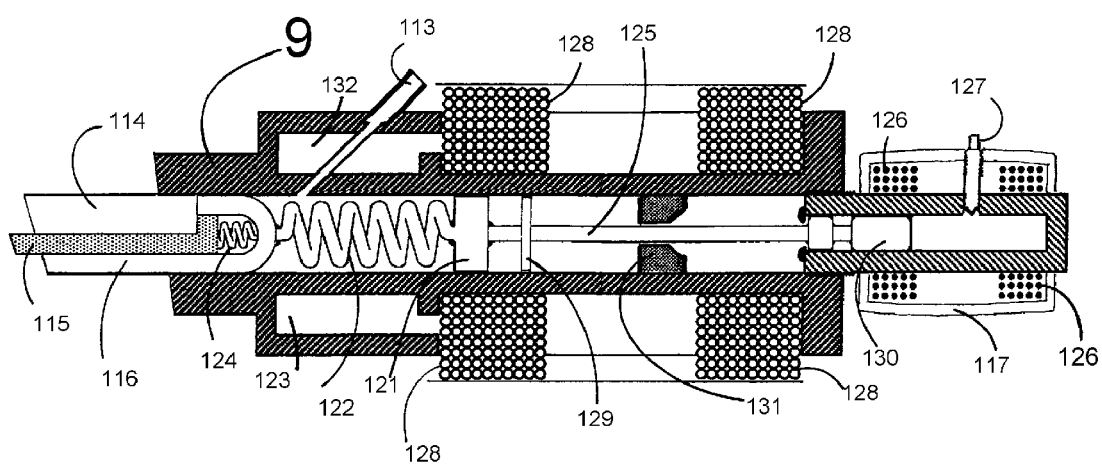

FIG. 12 V-V. Shows armature and solenoid details. Also depicts reluctance sensor (117) with a screw (127) to fix the armature movement. Remark: Percussion core (131) to accelerate gate input toward the ramp initial contact.

Figure 13:
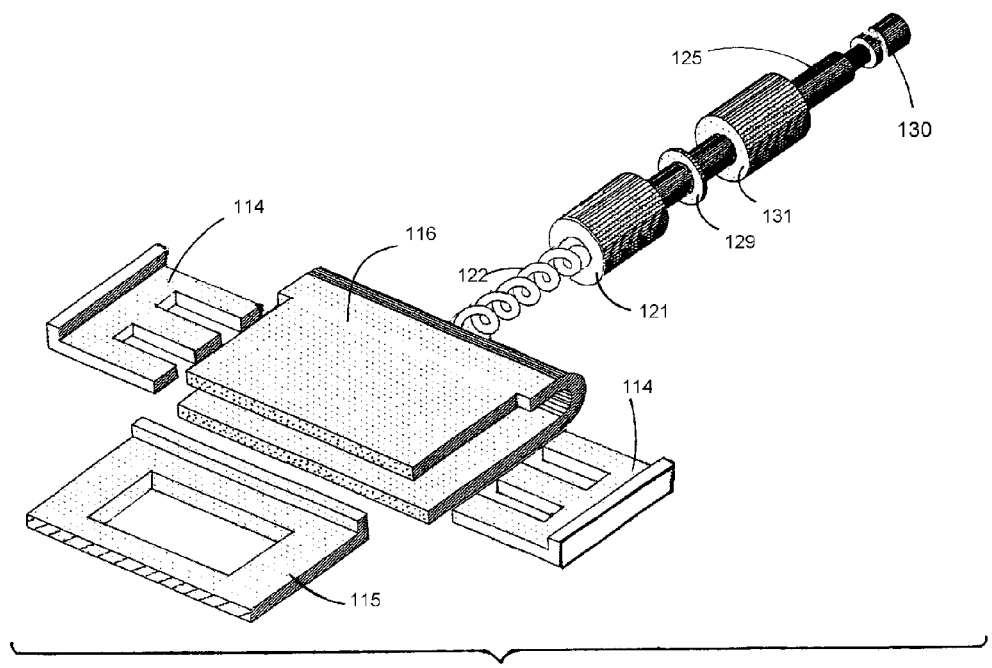

FIG. 13 Solenoid armature in exploded view, showing the lateral seals (114) and gate seal (115), as remarks.

FIG. 14 Show gate (116) only, lateral view, to show the seals holder (141). Also cut line VI-VI.

FIG. 15 VI-VI. Cross section, showing the gate seals holder (141) form. Remark: small springs (142) for the lateral seals.

Figure 16:
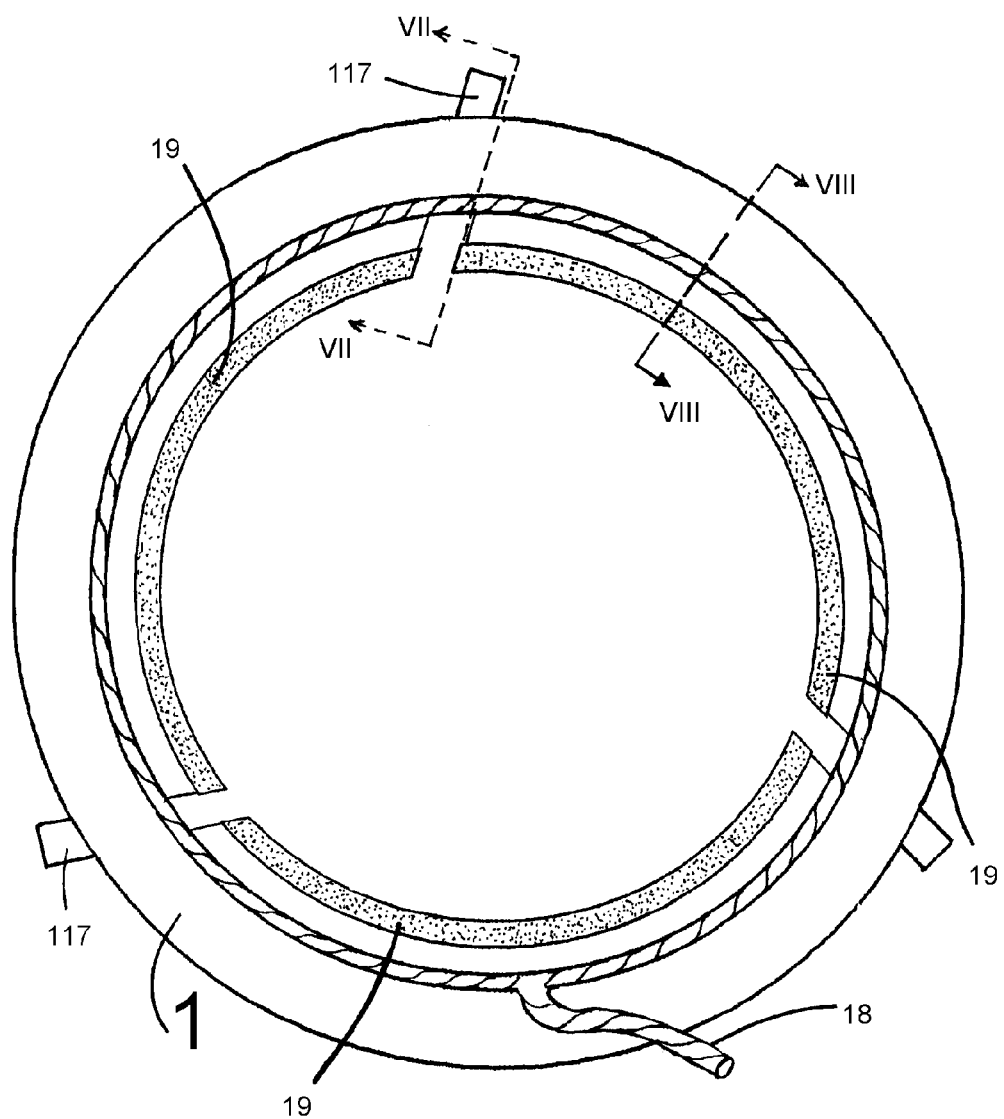

FIG. 16 Stator (1) front view, let to see sector seals (19) in place and the embedded re-circulation duct (18). Cut lines VII-VII and VII-VII also are showed. Remark: Reluctance sensor (117) is depicted here, only for cut orientation purposes.

FIG. 17 VII-VII Stator (1). Cross-section. With solenoid gate (9), in place. Remark: Shows the exact position of the re-circulation mix duct (18) and how touch on only rotor ends (3).

FIG. 18 VII-VII Stator (1) cross-section only. Shows the re-circulation duct (18) and the sector seals (19). Rotor ends (3) is presented only for orientation purposes.

Figure 19A:
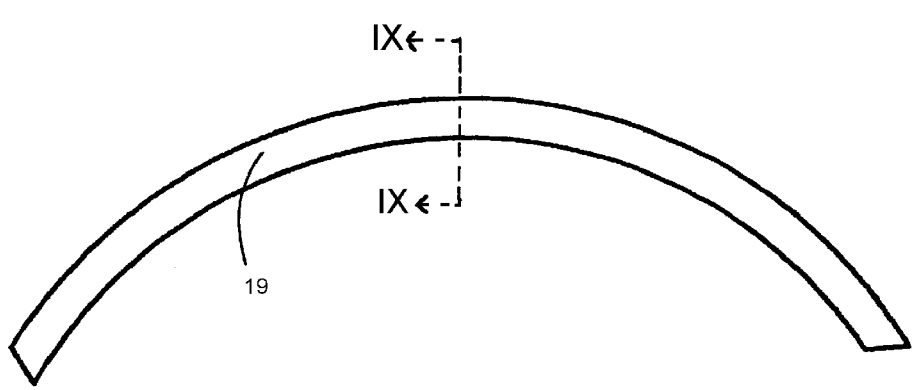
Figure 19B:
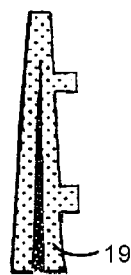
Figure 19:
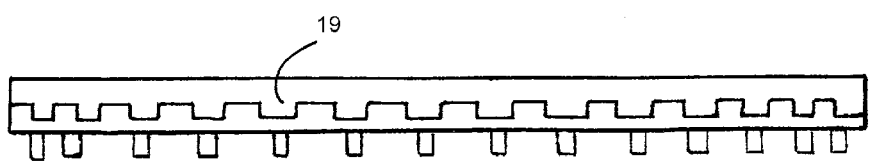

FIG. 19 Sector seal (19) bottom view, showing toothed form and small plugs.

FIG. 19A Sector seal (19) front view, showing the cut line IX-XI.

FIG. 19B, IX-IX. Sector seal (19), cross-section, showing slightly opened remarking the flexible material nature.

Figure 20:
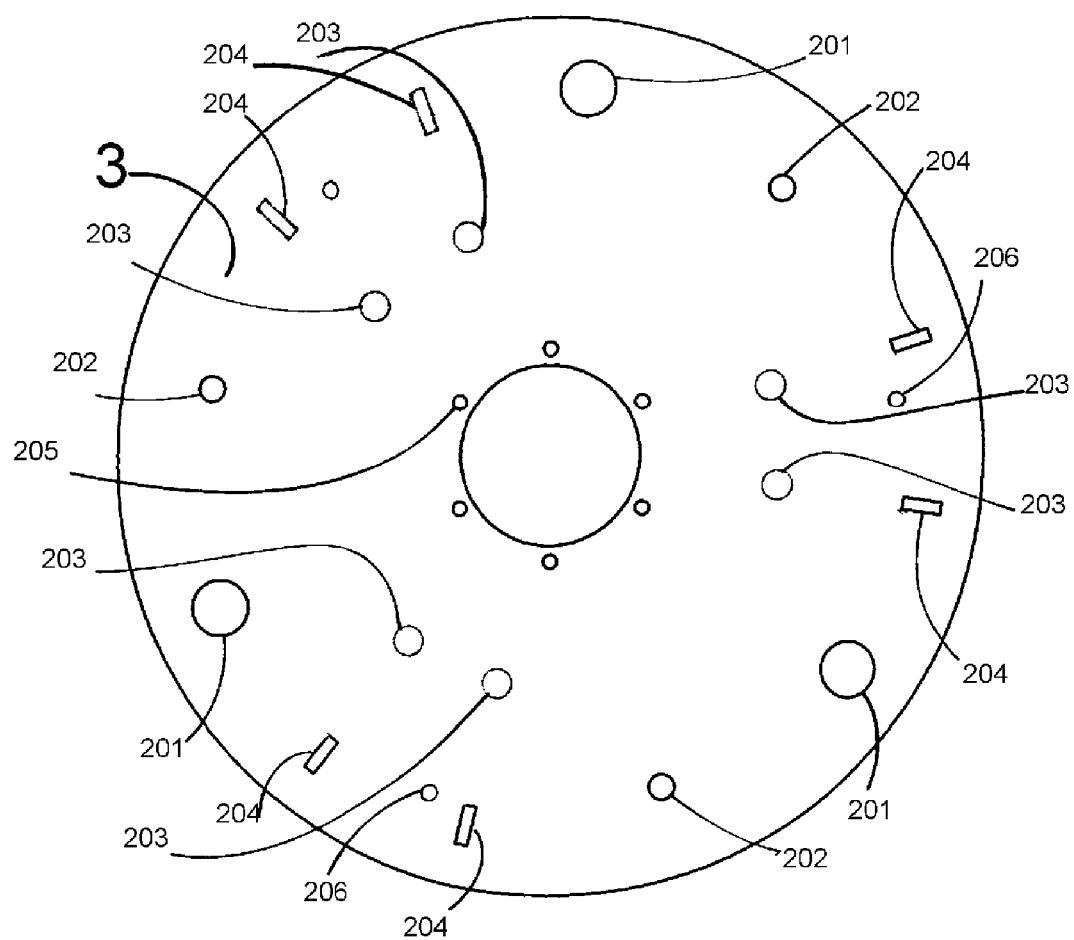

FIG. 20. Rotor end (3) show a plurality of holes and slots to attach or pass through internal elements. Remark: any not used hole (203) must be plugged.

Figure 21:
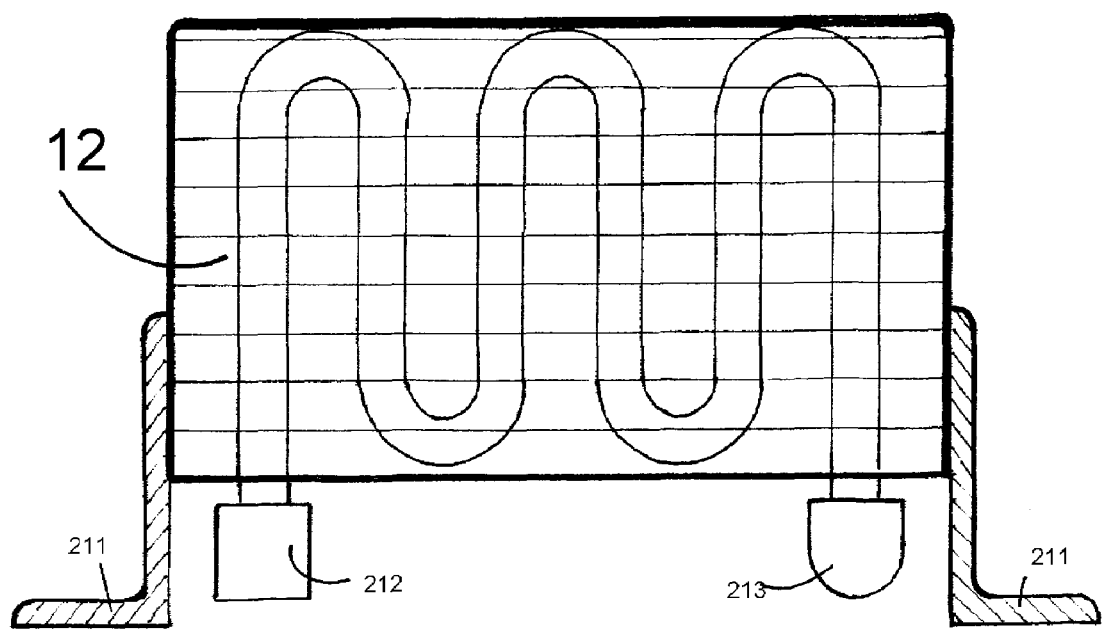

FIG. 21 Show radiator fin (12) with connectors (212,213) and legs (211). Remark: In case need more central space, that fin can be set outside of rotor periphery (for example as install electrical parts).

Figures 22, 23, 24:
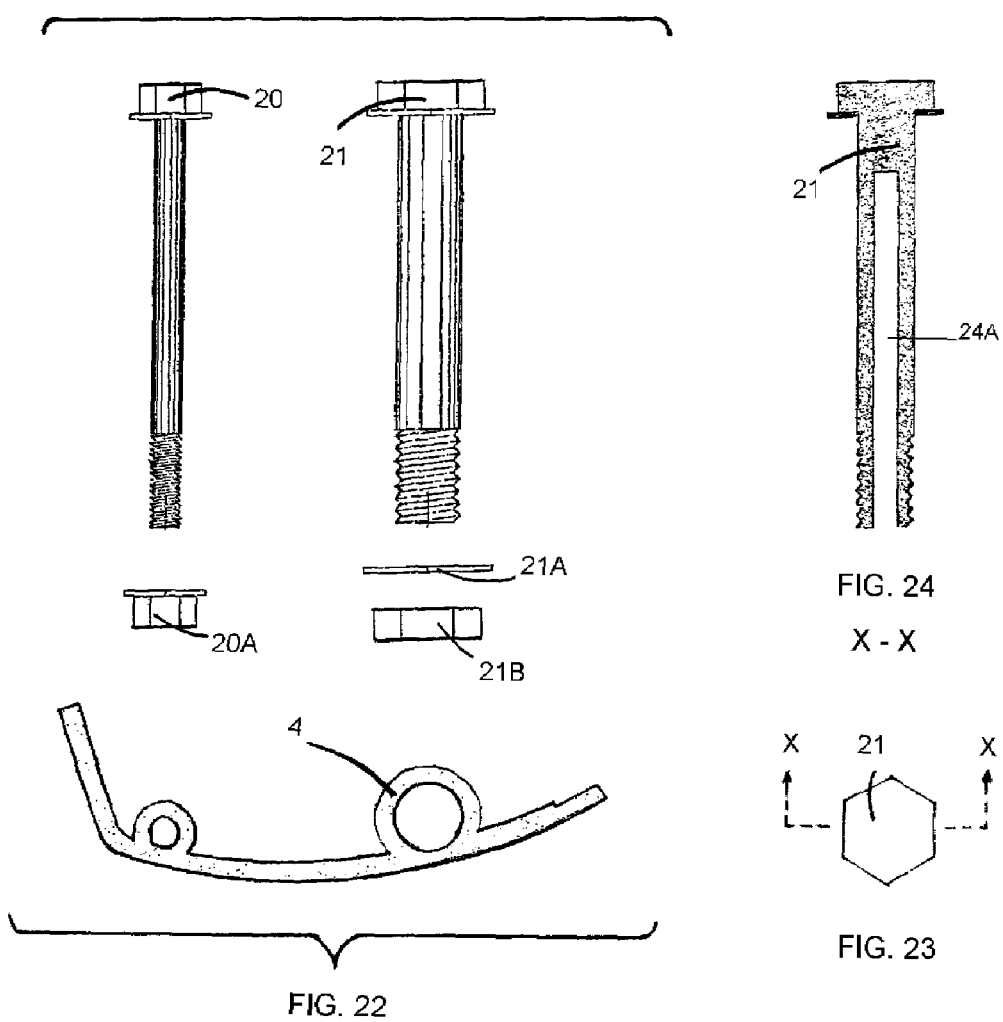

FIG. 22 Show ramp (4) lateral view and the correspondent bolts (20,21) to attach the rotor ends (3) with nuts (20A, 21B) and washer (21A). Remark: bolt (21) have more diameter than bolt (20) because needs have internal space for a temperature sensor)

FIG. 23 show bolt (21) cut line X-X.

FIG. 24 X-X show the bolt internal space (21A) for temperature sensor.

FIG. 25 Shows expansion chamber (5) top view and cut lines XI-XI and XII-XII. Remark: channeled area lets small surface area. That surface is on permanent contact with stator (1) inner wall, causing small friction. (See FIG. 31).

FIG. 26 XII-XII Expansion chamber (5) lateral view cut showing individual channels (252), internal cooling cavity (262) with couples (16) and also let to see the small detach chamber (261).

FIG. 27. XI-XI. Expansion chamber (5) toothed end close up, showing the relief valve (22) location with exhaust port toward lateral channel (251).

Figure 28:
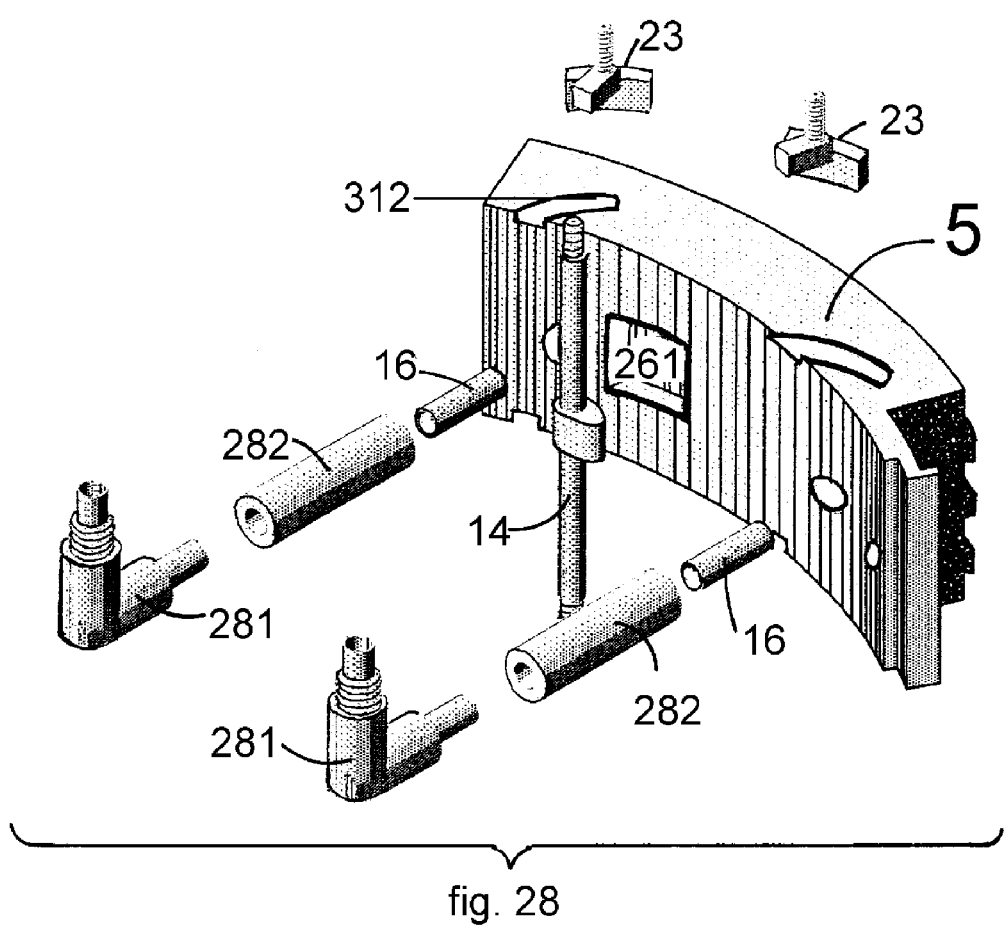

FIG. 28 Exploded view of expansion chamber (5) with separator camshaft (14), supports (23) and cooling system parts, as couples (16), hoses (282) and elbows. (281).

Figure 29:
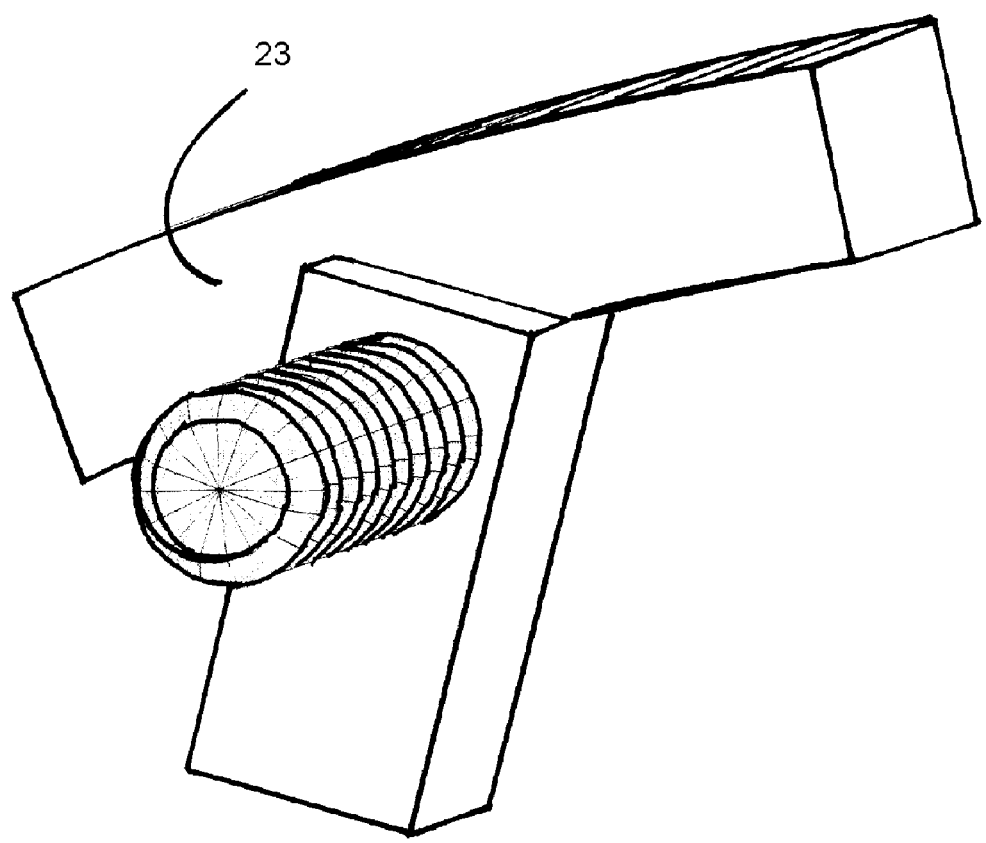

FIG. 29 shows the support (23).

Figure 30:
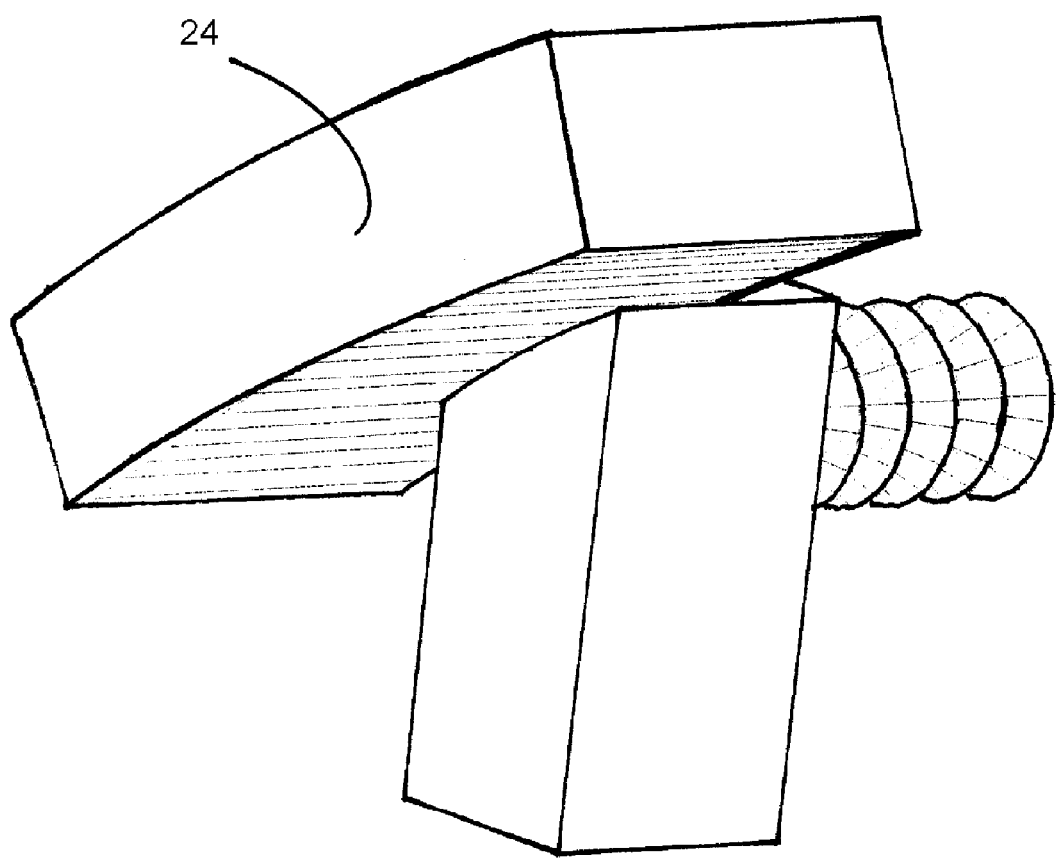

FIG. 30 shows the support (24) for the opposite side.

Figure 31:
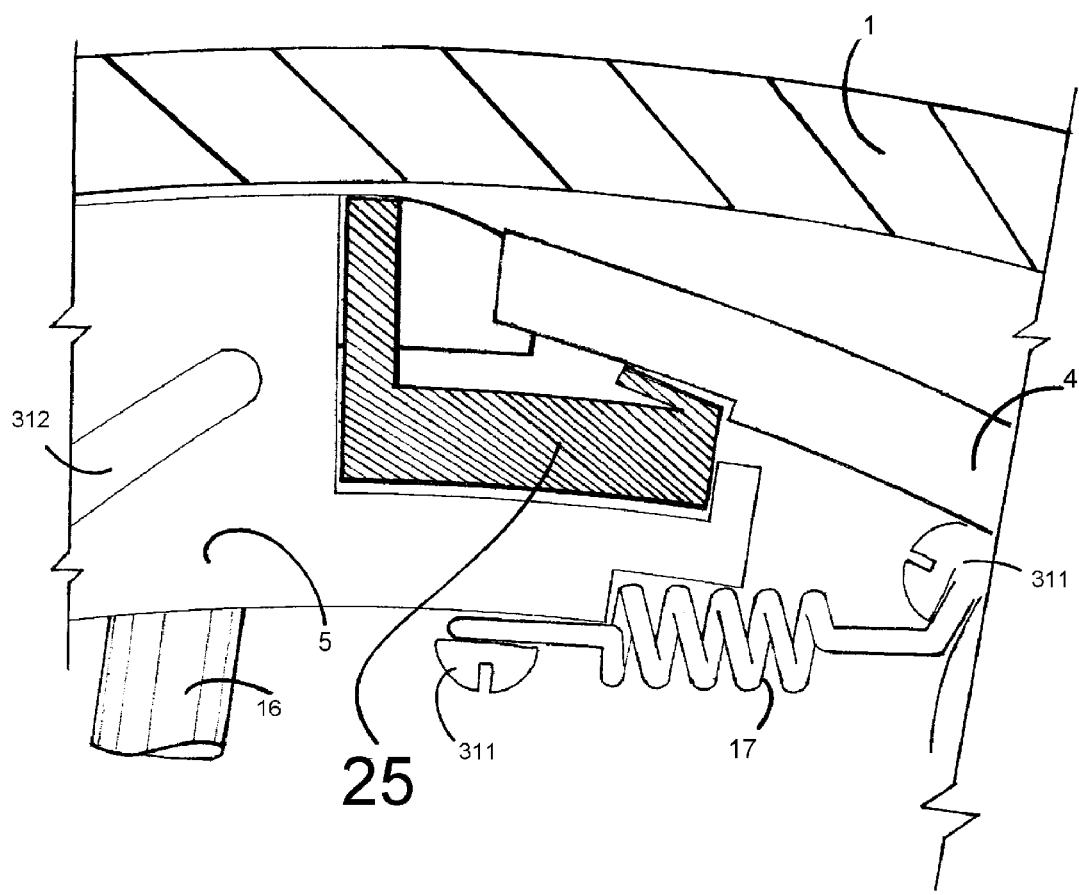

FIG. 31 Close up of expansion chamber (5) with the ramp (4) jointed by the spring (17), showing the union packer (25). Remarks: expansion chamber (5) touch on the stator (1) inner wall, but ramp (4) never touches the stator (1). (These close up was taken from FIG. 5 II-II.).

FIGS. 32, 33, 34 and 35. Only purpose is to define the union packer (25) form.

Figure 36:
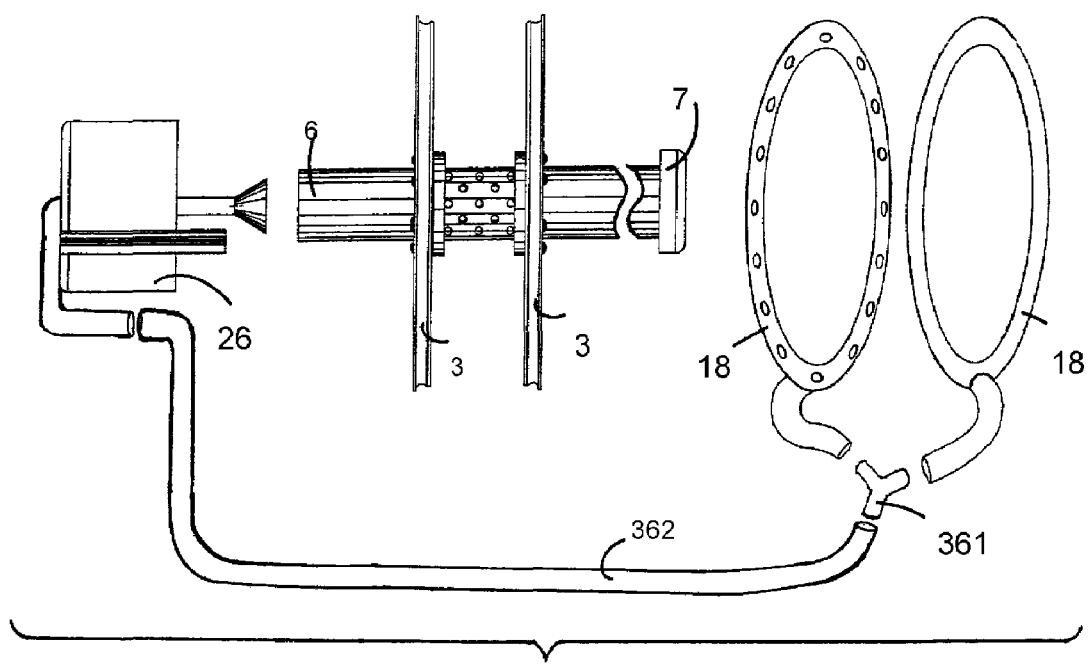

FIG. 36 Exploded view showing how drive shaft (6) is assembled with the air filter (26) and the rotor ends (3); rotor wall formed by (4) and (5) was removed to expose the shaft (6) perforated part between the ends (3). How to locate the re-circulation ducts (18) touching on the ends (3) was depicted in FIG. 18 VIII-VIII.

Figure 37:
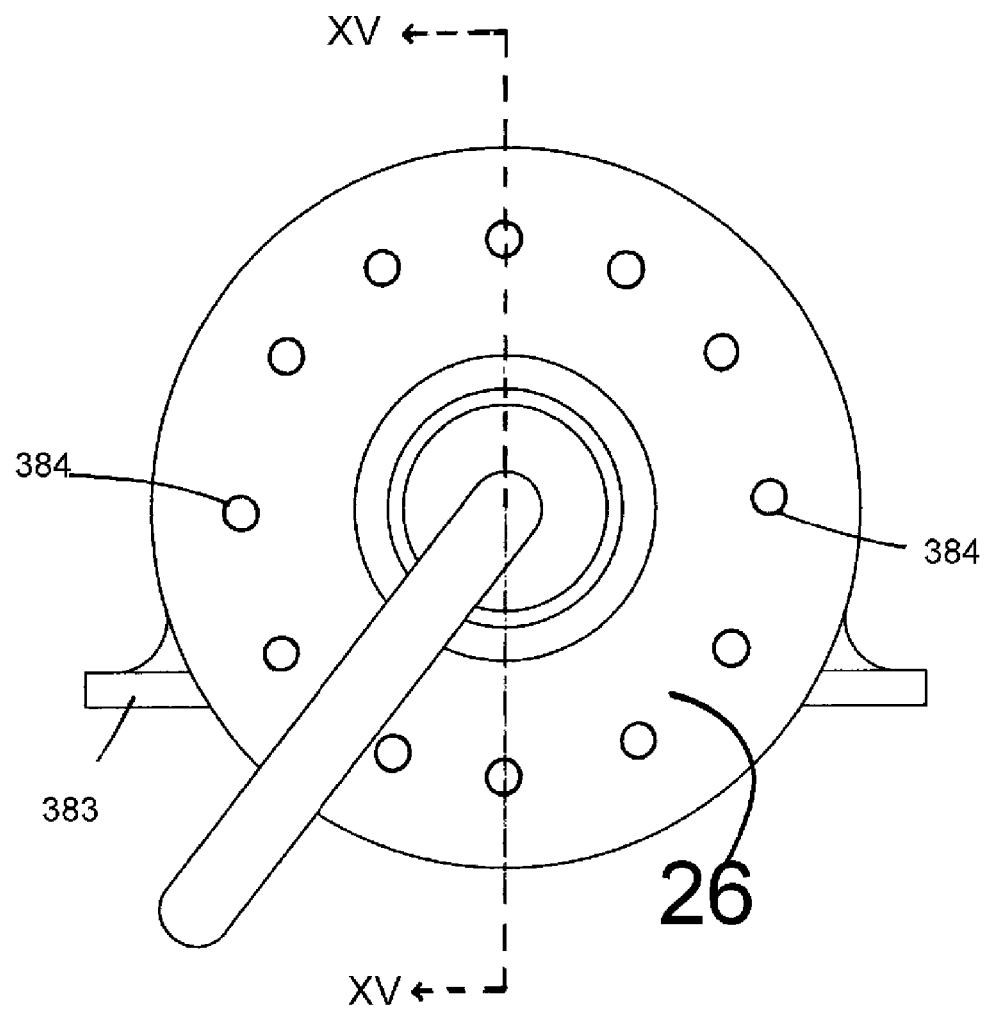

FIG. 37 Air filter (26) front view. Shows the cut line XV-XV.

Figure 38:
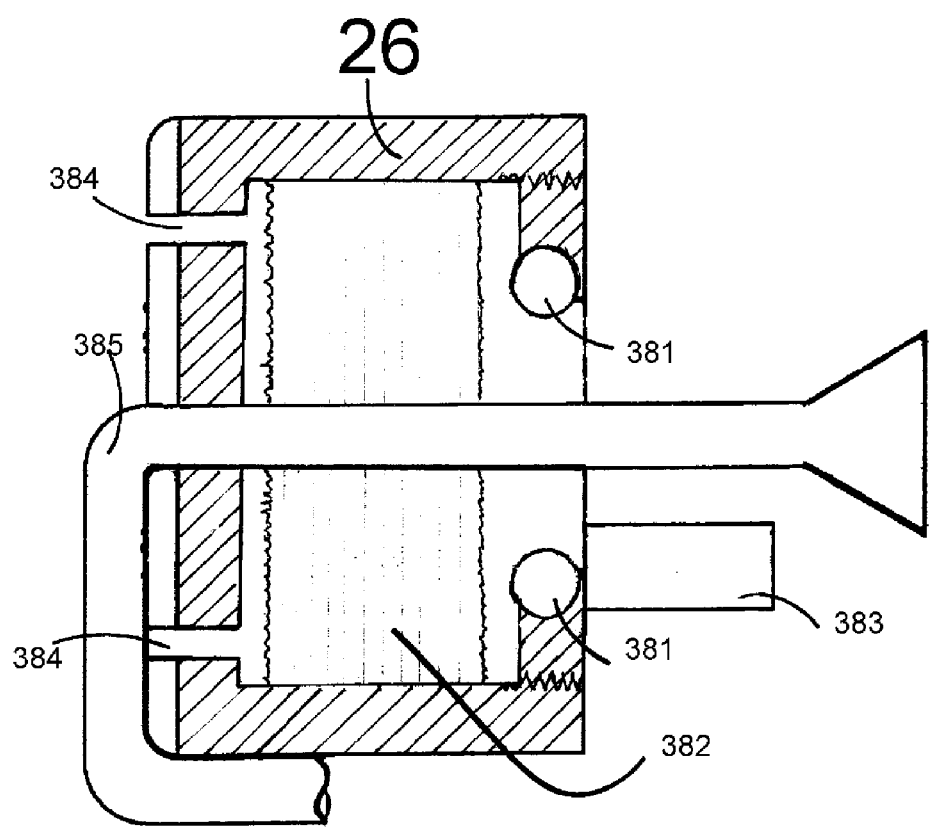

FIG. 38 XV-XV Shows filter (26) internal parts. Legs (383) must be attached at base holes (33) in FIG. 3, I-I.

Figure 39:
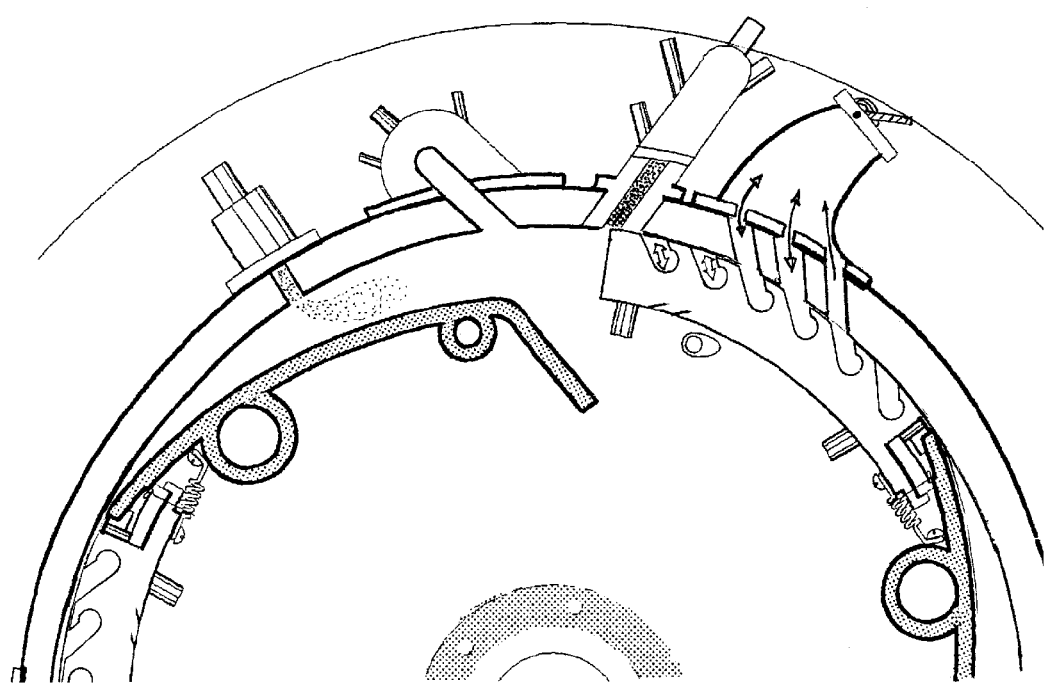
Figure 39A:
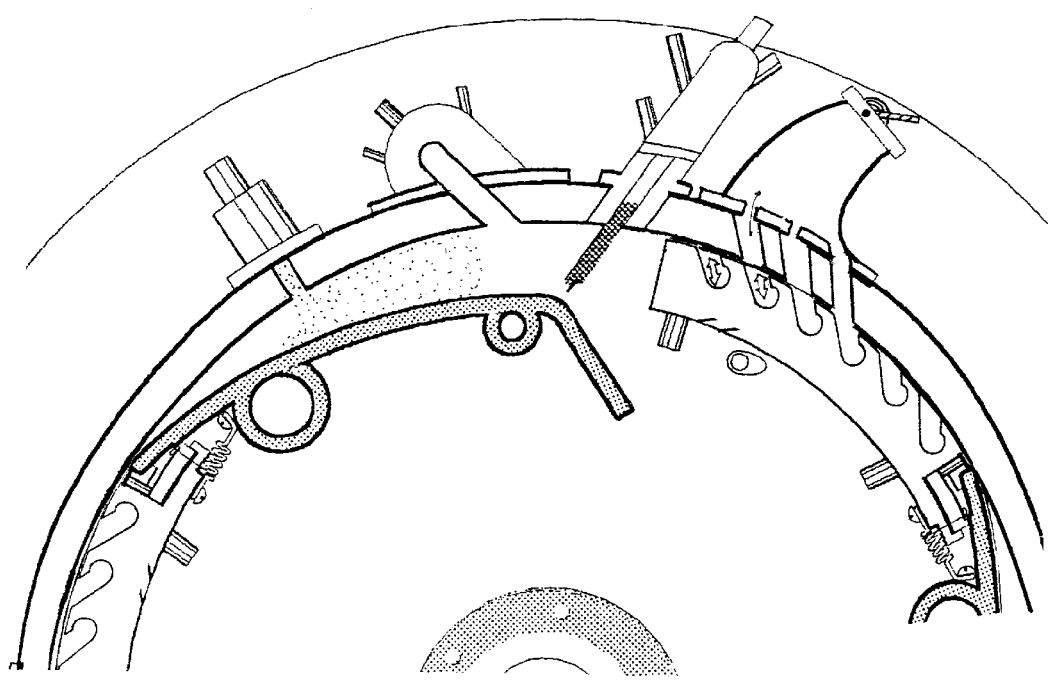

FIG. 39, and versions A, B, C, D are a rough sketch, to illustrate only working engine cycle.

DETAILED DESCRIPTION OF THE INVENTION

These engine works based on modules operating at the periphery of the rotor, each one consisting mainly of three chambers and one gate (9). and capable of using technology improvements in the areas of computing, electricity and electronics. A three module preferred embodiment is illustrated in the simplified expanded view in FIG. (1) and another cut view of the rotor inside the stator in FIG. (5) II-II, showing the main components.

Basically the engine has a stator (1), its form seems as a toroid of rectangular cross section (FIG. 18 cut VIII-VIII) where inside has solenoid gate valves (9), combustion chambers (8), and tuned ducts exhaust ports (1 0). Also contains all sort of standard parts used In Otto engines, such as sparkplugs (not showed), injectors (15), sensors (not showed) and a circular heat radiator (2).

It has a concentric rotor, reel resembling, in a short height cylinder form, with the wall formed by ramps (4), as vanes forms; jointed by a packer (25) and a spring (17) at the expansion chambers (5), (FIG. 31). Those chambers (5) also form the wall of the cylinder, and has a form of sectors of a toroid of rectangular cross section (FIG. 28), with a sort of channels or cavities in the exterior wall, with arch form grooves (312) in both plane sides, with mountings (23,24) attached at the cylinder ends (3).

It also has internal cavities (262), couples (16), hoses (282). elbows (281) and radiant external fins (12) for cooling system. The outside central part of the ends (3), near the shaft (6) Is disposed for mounting electrical parts (not showed) (as starter, generator or alternator). Mounting bolt (21) of the ramps (4) has space (24A) inside for a temperature control sensor (not showed). Small external cavity (261) nests the detach camshaft (14), all threaded parts are supported at the ends (3) with nuts (not showed). Ends (3) outside, supports with legs (211), the radiator fins (12), couple (212) and elbow (213).

FIG. 36 shows the rotor assembled (using holes (205)), with the drive shaft (6), with cylinder wall components (4,5) removed. The shaft (6) is a concentric supportive tube, perforated in the inside part between the ends (3) of the rotor for air input and air/fuel mix return, one end is closed (7) and the other is loosely coupled at the air filter (26), supports a cooling water pump (not showed) a small generator (not showed), and a pulley for drive parts fixed at the base (not showed). More complex version could be support an electric or turbo charger, modifying the filter (26) fixed at base holes (33), (not showed). Or also could use the plug (7) to put a concentric hydraulic coupling seal, to use only a stationary cooler pump (not showed).

Engine base (13) has mounting holes (31). Holes (32) and bearings (11) keeps aligned the rotor inside the stator (1), also with screws (34); with plenty space to support auxiliary stationary parts (not showed), (as electric generator, air compressor, pumps and cooling parts for the stator (1)). There are also, flexible sector seals (19), for the edges joint of rotor and stator (1), (in FIG. 16) and flexible air ducts (18) for mix air/fuel re-circulation of any leak, returning toward the air filter (26) through a hose (362). That hose or flexible duct, serves as used lubricant storage also.

Simplified drawings FIG. (39), A, B, C and D (presented as rough sketch illustrations) show rotor various different angular positions in a module, and describe the working cycles of the engine.

FIG. 39 shows last Otto cycle finishing; exhaust gases going out, gate (116) is next to fast input inside the rotor, toward ramp (4). Inside solenoid gate valve (9), percussion core (131) is going down to hammering the gate core (121). Fuel injector (15) begins to work.

Figure 39B:
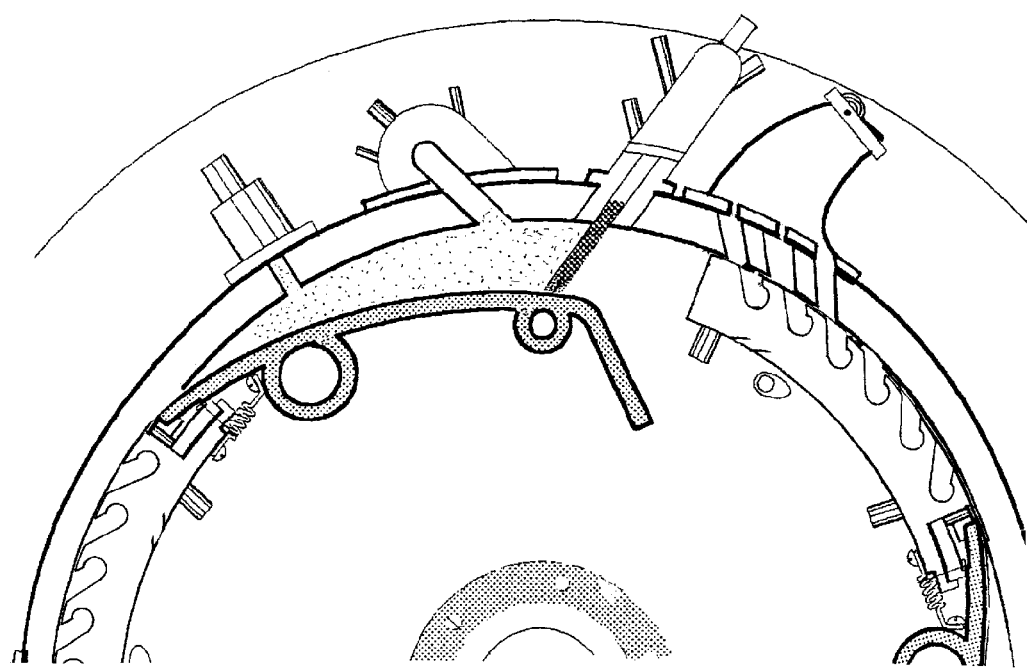
Figure 39C:
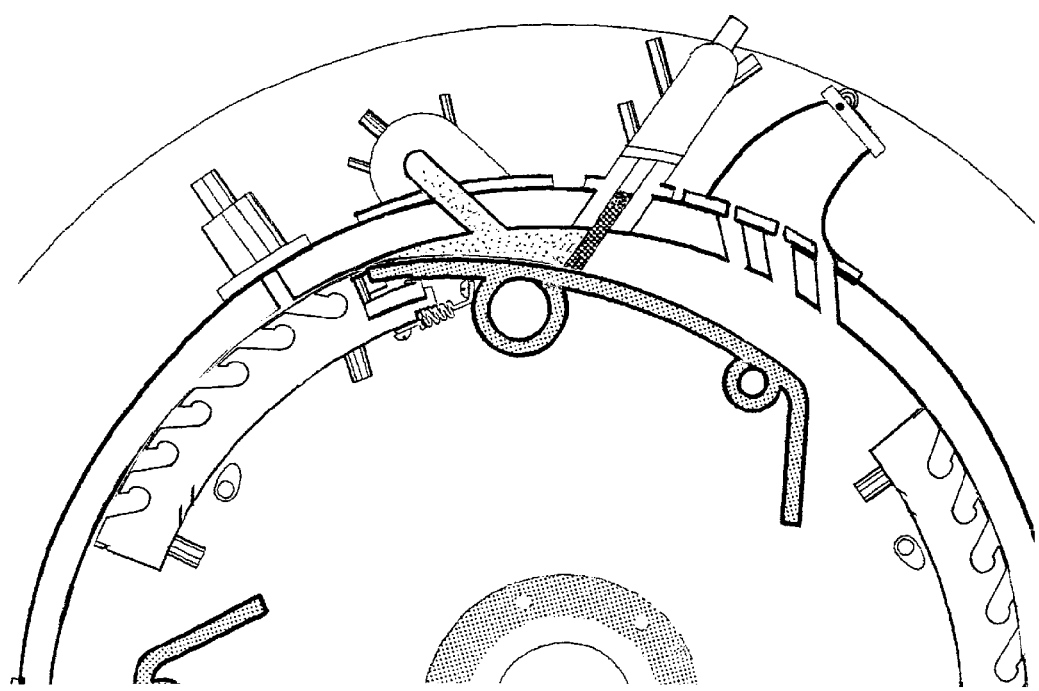

FIG. (39) A, show the motion of the rotor shifting the ramp (4) and the sliding gate (116), creating a virtual compression chamber, causes that the volume of air and the fuel vaporized by the injector (15) in that chamber decreases (FIG. 39B), leading the compressed mix towards the combustion chamber (8), (FIG. 39C).

Figure 39D:
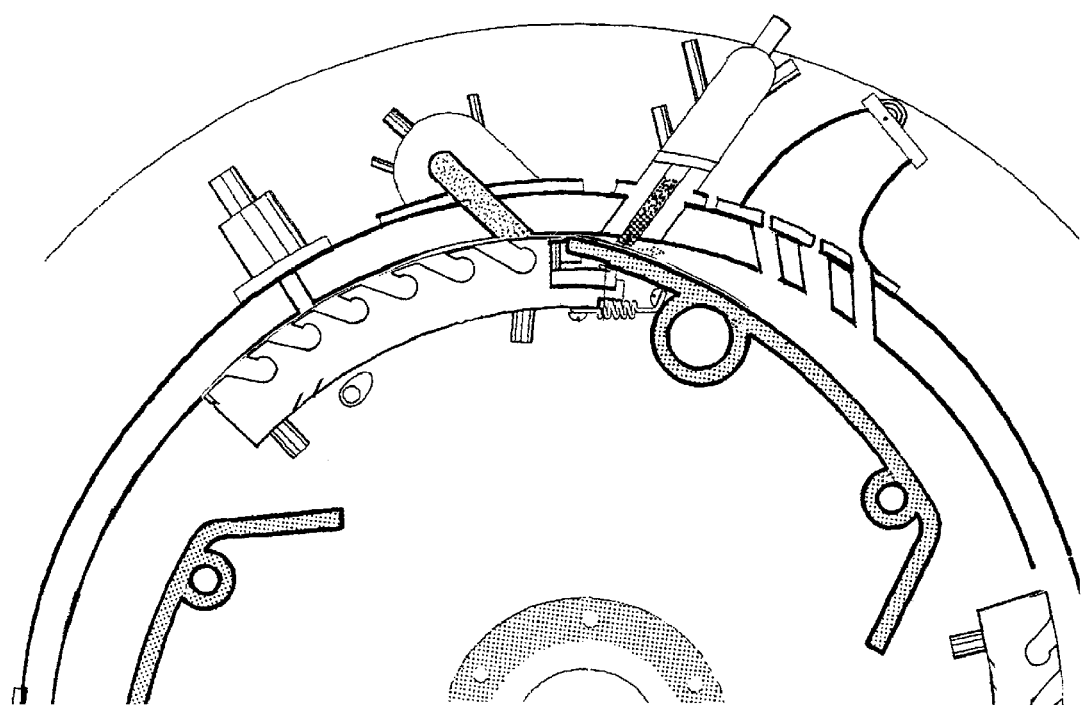

The firing, by the spark plug (not showed) triggered by the signal of reluctance sensor (117), happens when the rotor movement aligns the first cavity (252) of the expansion chamber (5), (FIG. 39D) and sequentially receives the force of the explosion, driving the rotor, and then exhausted gases are conveyed at the escape port (10).

The seal (115) of the gate, avoids any leakage toward the ramp (4), but after the first cavity (252) passes, the gate is pulled out, saving unnecessary wear during the time when expansion chamber (4) is present and return rapidly at initial condition of fig (39) ready for next cycle. When gate (115) is on ramp (4) toothed end (FIG. 39D), happens residual compression relief through slots.

Otto cycles occur in compression and aspiration fashion first, expansion/exhaust develops almost simultaneous after, that illustrates that the engine operates in two times.

Tuned exhaust ports holes (109) let create a backpressure, and gives additional impulse at the rotor. There is a rough check valve (91), with spring (96) screwed at the stator (1) wall, calibrated at rotor internal pressure preventing mix escapes at the atmosphere.

Because Physics defines Torsion as the result of the force multiplied by distance at point of rotation, easy conclusion is that at any force value of explosion applied near the tangential multiplied by the value of rotor radius, will be near maximum theoretical torsion value.

The symmetrical geometry and concentricity, torsion soft modulation (because explosions high frequency), and stepped attenuation of exhausted gases, brings a device with few vibrations, less noise and best of all, without considerable internal mechanical energy loses.

Increments in modules quantity, adding few additional mass, leads at exponential growing of number of explosions per rotation, giving best power/weight ratio, without any increase of drive shaft length.

Computer controlled gate let dynamically compression ratio variation for instantaneous correction upon load conditions, velocity, acceleration, fuel type, temperature and barometric pressure. That is accomplished changing the velocity of the gate inlet, touching the ramp at different points.

Another computer fundamental function is keep at minimum the differential of temperature between stator and rotor, which has disposed space inside in one of the ramp bolt, for a temperature sensor (not showed), that can be wired, or wireless electronics best. Computer adjustments take place in stator cooling system or both stator and rotor. Also computer takes over another traditional tasks as fuel injection, firing time control, rotor position and angular velocity.

That manner is possible to keep engine thermal expansion between design parameters. And that class of expansion also is absorbed by the re-circulation duct (18) flexibility and the self-adjust characteristic of the expansion chamber, and also contributes sector seals, gate lateral seals (114) and spring (142), (supported with seal holder (141)). Additional computer control is possible electrically acting over spring (96), (fixed at stator with small screw (95)), to dynamically modify the exhaust check valve port (91) pressure, in case the engine use turbo or electric charger (not showed). Air pressurized injector (not showed) at the combustion chamber ventilates the residual gases inside space (66), at near end of the expansion time (across any hole (62)).

These low RPM engine can use a variety of fuels, very adequate for hydrogen and gives excellent isothermal approach control, using compressed air as an external energy supply, taking advantage of compression cycle heat.

In transportation use, braking energy recovery is possible electrically, using a central generator at rotor and also is possible in form of compressed air.

In last case of compressed air will be necessary to modify the combustion chamber air injector system (not showed), to avoid waste the pressure from the virtual compression chamber, before the expansion chambers aligns (not showed).

The exposed toward atmosphere rotor concept, let use cooling system, and also using it as fan for stator cooler and no limits thermal expansion, avoiding stalls. Another concept: slid able mountings (23,24) of expansion chamber (5), also let self adjust, compensates thermal changes, compensates wear, and keeps centrifugal forces at minimum effect.

Relief valves (22) inside the expansion chambers (5) are provided for misfiring; the union spring (17) between the expansion chambers (5) and the ramps (4) gives additional relief. Those valves discharge in lateral channels (251). Lubrication can be provided through the solenoid gate oil inlet (113) and at the rest of the frictional areas inside the engine. This can be omitted upon low friction materials election. Also it can be lubricated by high-pressure injection in another part of the stator (1).

Engine overall internal friction is very low, inasmuch as expansion chambers (5) have a large channeled surface, letting few frictional area with the stator (1) inner wall. The sector seals (19) also cause low friction; the re-circulation ducts (18) only touch on the rotor (3) edges and the gates friction can be reduced yet, using the solenoids magnetic force.

Elimination of the main friction in the module can be accomplished (by turn) manually or electrically (not showed) in disposed points (127) and points (206). Evident advantage is at idle operation. Also requiring less power in starter and battery (extending life also). Using 3 modules as preferred embodiment here, the engine causes in each turn, nine Otto cycles, in other words, 3 elevated at the second power. Using six modules, 36 Otto cycles are produced or in other words 6 elevated at the second power. In general, being N=number of Otto cycles, and M=number of modules, then N=M.expo.2.

Upon quantity of modules increments, an auxiliary pump can be used in series circuit form, for help air/fuel mix re-circulation. (Not showed)

Maintenance is very simple, with common tools. Gates replacement is fast and easy without machine opening (ring seals change, equivalent in Otto engine) and long interval service, (as change pistons, in Otto engine) also can be made adjusting the supports (23,24) with shims in outer points (204).

Other variants of the solenoid gate could be a cam driven by stepper motor (not showed) or traditional camshafts mechanical linkage (not showed).

Engine basic design introduced here, by reliability, production costs, application, fuel economy operation and other factors, admits many combinations in its configuration, for that cause auxiliary systems, as electricity, electronics parts, computer hardware and software, compressed air and some parts of the cooling system are not showed.

Modular concept developed here, using gates with physical and virtual chambers; the outside exposed rotor ends concept; computer controlled gate concept and other new characteristics brings at the applications designer a new and broad development field, for that reason the presented invention will not be construed at these Description and at actual drawings, only at the spirit of Claims.

MODULAR ROTARY ENGINE MAIN PARTS LIST

1—Stator FIG. 1
2—Radiator FIG. 1
3—Rotor End FIG. 1
4—Ramp FIG. 1
5—Expansion Chamber FIG. 1
6—Drive Shaft FIG. 1
7—Plug FIG. 1
8—Combustion Chamber FIG. 1
9—Solenoid Gate Valve FIG. 1
10—Exhaust Port FIG. 1
11—Bearing FIG. 1
12—Radiator fin FIG. 1
13—Base FIG. 1
14—Detach Camshaft FIG. 5 I-I
15—Fuel Injector FIG. 5 I-I
16—Couple FIG. 5 I-I
17—Union Spring FIG. 5 I-I
18—Re-circulation Duct FIG. 16
19—Sector Seal FIG. 16
20—Ramp bolt FIG. 22
21—Ramp bolt FIG. 22
22—Relief Valve FIG. 27 XI-XI
23—Expansion chamber Support FIG. 28
24—Expansion Chamber Support (opposite side) FIG. 30
25—Union Packer FIG. 31
26—Air Filter FIG. 36

DESCRIPTION OF SMALL HARDWARE AND ANOTHER CONSTRUCTION DETAILS

FIG. 3 I-I (31) Hole for support all engine (32) Bearing fix screw hole (33) Filter fix screw hole
FIG. 6 (61) Fix Hole (62) Sparkplugs and injector holes (63) Water inlet (64) Knock sensor screw hole
FIG. 9 (91) Check Valve port (92) Support hole (93) Exhaust pipe support hole (94) Shaft
FIG. 10 IV-IV (109) Tuned port (1010) exhaust port slot hole
FIG. 11 (111) Support hole (112) Water inlet (113) Oil inlet
FIG. 12 V-V (121) Solenoid Core (122) Spring (123) Water Cavity (124) Gate Spring (125) Shaft (126) Reluctance coil (127) Fix screw (128) Coil (129) Washer (130) Reluctance (131) Percussion (132) Water cavity core core
FIG. 15 VI-VI (150) Fix Screw hole
FIG. 20 (201,202) Bolt holes (203) Elbow hole (204) Support slot (205) Drive shaft hole (206) Detach camshaft hole
FIG. 22 (20A) Nut (21A) Washer (21B) Nut
FIG. 28 (281) Elbow (282) Short Hose
FIG. 31 (311) Union spring screw (312) Grooves for nest Supports (23,24)
FIG. 36 (361) Plumber Y
FIG. 38 (381) O-ring seal (382) Paper Element (383) Filter Leg (384) Air input hole (385) Re-circulation duct

What is claimed is:

1. A rotary engine comprising:
a stator being a rectangular section toroidal housing; said stator further comprising:
  a circular heat radiator for cooling said stator;
  circular flexible ducts and flexible seals for cylinder rotor edges contact; and
  a plurality of sectors, wherein each of said sectors further comprising:
    a fuel injector;
    an exhaust tuned port with a check valve;
    a combustion chamber,
      wherein said combustion chamber includes a cooling/water inlet, a spark plug, an injector and a knock sensor;
    an essentially solenoid gate valve;
      wherein said solenoid gate valve includes water cavities/passages for heat cooling, oil inlet/passage for internally lubricating, retractable seals, and percussion core for cushioning;
      wherein said solenoid gate valve is slidable toward the rotor, and
      wherein said solenoid gate valve is controlled by electric coils and reluctant sensors; and
      wherein said solenoid gate valve has a screw as mechanical means to immobilize the solenoid gate valve movement;
a cylinder rotor, with a wall concentrically inside said stator and ends exposed toward exterior, said cylinder rotor further comprising:
  a plurality of ramps and a plurality of expansion chambers forming a wall;
a rotational drive shaft;
  wherein each of said plurality of the ramps being of rectangular section vane, with holes for bolt mountings at the ends of said cylinder rotor;
  wherein one of the bolts has internal space disposed to locate the temperature sensor;
  wherein each of said plurality of the expansion chambers is of a toroidal sector rectangular cross section;
  wherein a curvature is matched with an internal wall of said stator;
  wherein an outer wall of said each of the plurality of said expansion chambers has a plurality of cavities to receive the explosion gases and convey toward exhaust ports;
  wherein an inner wall of said each of the plurality of said expansion chambers includes inlets for an internal heat cooling cavity and an external cavity for a detach small cam, wherein plane walls being perpendicular to a rotation axis of said toroidal sector have both supporting curved grooves with same curvature of the stator internal wall, with mountings located in the cylinder rotor ends, curvature cords of said supporting curved grooves and radii of the rotation axis of said toroidal sector forming angles being not equal at 90 hexadecimal degrees;

wherein one end of said each of the plurality of said expansion chambers has a relief valve in contact with a virtual compression chamber formed by the movement of the ramps and the solenoid gate valve, and supports one end of a union spring and a union packer, for keeping both the contact with one end of said each of the plurality of the ramps;

wherein a camshaft is located between said rotor ends for separating the contact of said each of the plurality of the expansion chambers with said stator internal wall;

wherein hoses and elbows circulates cooling liquid from said expansion chamber toward radiant external fins wherein an exterior of the rotor ends has said radiant external fins, and near the center, a space is disposed for supporting to an electrical starter, and generator or alternator;

wherein said rotational drive shaft, tube form, has holes for for air/fuel mixture passing through; in a segment located within said cylinder rotor, on end of said rotational drive shaft end being loosely coupled with an air filter and an flexible duct end for returning of the air/fuel mixture; the other end being closed; and a space for an electrical air pump or an electrical compressor to be disposed;

ducts for recirculating the air and fuel mixture toward air input of said rotational drive shaft;

a temperature sensor for controlling and keeping at minimum the temperature differential between said rotor and said stator;

bearings for keeping the cylinder rotor concentrically aligned between the stator, and a base for supporting the entire engine.

2. The rotary engine according to claim 1, wherein the solenoid gate valve further comprises a driver element being a cam with a stepper motor or a camshaft mechanical linkage.

3. The rotary engine according to claim 1, wherein said electrical air pump is to boost recovery air and fuel mixture.

* * * * *